(12) United States Patent
Kitade et al.

(10) Patent No.: US 7,915,359 B2
(45) Date of Patent: Mar. 29, 2011

(54) PROPYLENE RESIN COMPOSITION

(75) Inventors: Shinichi Kitade, Mie (JP); Hideshi Uchino, Mie (JP); Jun Shinozaki, Mie (JP); Kuninori Takahashi, Mie (JP); Kenji Masuda, Mie (JP)

(73) Assignee: Japan Polypropylene Corporation, Tokyo (JP)

( * ) Notice: Subject to any disclaimer, the term of this patent is extended or adjusted under 35 U.S.C. 154(b) by 156 days.

(21) Appl. No.: 12/064,643

(22) PCT Filed: Sep. 22, 2006

(86) PCT No.: PCT/JP2006/318852
§ 371 (c)(1),
(2), (4) Date: Feb. 25, 2008

(87) PCT Pub. No.: WO2007/034915
PCT Pub. Date: Mar. 29, 2007

(65) Prior Publication Data
US 2009/0118414 A1  May 7, 2009

(30) Foreign Application Priority Data

Sep. 22, 2005 (JP) ................................. 2005-275623
Jan. 27, 2006 (JP) ................................. 2006-019890

(51) Int. Cl.
C08F 210/06 (2006.01)
C08F 210/16 (2006.01)
C08F 4/64 (2006.01)

(52) U.S. Cl. ........ 526/160; 526/170; 526/943; 526/941; 526/348; 525/240

(58) Field of Classification Search .................. 526/348, 526/160, 170; 525/240; 524/451
See application file for complete search history.

(56) References Cited

U.S. PATENT DOCUMENTS

| | | | |
|---|---|---|---|
| 6,420,579 B1 * | 7/2002 | Alt et al. ........................ | 556/11 |
| 6,518,363 B2 * | 2/2003 | Kanzaki et al. ................ | 525/240 |
| 2001/0021732 A1 * | 9/2001 | Terano et al. .................. | 523/351 |
| 2002/0040105 A1 | 4/2002 | Kanzaki et al. | |
| 2004/0030052 A1 * | 2/2004 | Kanzaki ........................ | 525/323 |
| 2004/0092662 A1 * | 5/2004 | Goto et al. ..................... | 525/88 |

FOREIGN PATENT DOCUMENTS

| | | |
|---|---|---|
| EP | 1 162 219 A1 | 12/2001 |
| JP | 58-122909 * | 7/1993 |
| JP | 2003 2939 | 1/2003 |
| JP | 2003 147035 | 5/2003 |
| JP | 2003 147157 | 5/2003 |
| JP | 2003-147157 * | 5/2003 |
| JP | 2003 147158 | 5/2003 |
| WO | WO 00/11076 | 3/2000 |

OTHER PUBLICATIONS

Morioka et al. (JP 2003-147157), May 2003, abstract and translation in English.*

* cited by examiner

*Primary Examiner* — David Wu
*Assistant Examiner* — Rip A. Lee
(74) *Attorney, Agent, or Firm* — Oblon, Spivak, McClelland, Maier & Neustadt, L.L.P.

(57) ABSTRACT

A propylene resin composition which is a three-component material is improved in rigidity, heat resistance, and impact resistance while maintaining a satisfactory balance among these and further improved in low-temperature (about −30° C.) impact resistance. A propylene resin composition as described in the specification.

16 Claims, No Drawings

PROPYLENE RESIN COMPOSITION

TECHNICAL FIELD

The present invention relates to a propylene resin composition. More particularly, the invention relates to a three-component resin composition comprising a specific crystalline propylene polymer ingredient and two specific propylene/ethylene copolymer ingredients. Specifically, the invention relates to a composition which comprises a crystalline propylene polymer ingredient and two propylene/ethylene copolymers, has been obtained by conducting multistage successive polymerization using a metallocene catalyst, with which highly homogeneous copolymerization is possible, or by blending the ingredients, and is characterized by being excellent in rigidity, heat resistance, and impact resistance while attaining a satisfactory balance among these and by being improved also in low-temperature impact resistance.

BACKGROUND ART

Propylene resins hold an important position as a general-purpose resin material in industrial fields because of their excellent performances such as moldability and various properties, profitability, and suitability for the mitigation of environmental issues. However, the resins are relatively low in impact resistance, which is an important property. Techniques for improving the impact resistance have hence been well known which employ a propylene/ethylene random copolymer or a composition obtained by blending polypropylene with the copolymer.

Of such compositions, a typical example of the compositions obtained through a series of polymerization steps is one obtained by producing crystalline polypropylene in a first step and producing a propylene/ethylene copolymer in a second step. This composition, which is usually called a propylene/ethylene block copolymer, exhibits excellent performances with respect to a balance between rigidity and impact resistance and, hence, has been used in many industrial fields including automotive interior/exterior trim parts.

Industrially, such propylene/ethylene block copolymers are mostly produced with a Ziegler catalyst. It is, however, known that a Ziegler catalyst generally has many kinds of active sites (so-called multisite) and brings about a wide molecular-weight distribution and a wide comonomer composition distribution in propylene/ethylene copolymer parts.

In such a propylene/ethylene copolymer having a wide composition distribution, propylene segments or ethylene segments may be present in the copolymer in such an amount that crystallization is possible. These segments are thought to adversely influence the impact resistance of the block copolymer. It has further been pointed out that low-ethylene-content components and low-molecular components among the components of the copolymer ingredient dissolve in the crystalline polypropylene ingredient, resulting in impaired heat resistance. (See patent document 1.)

Many attempts have hence been made to improve rigidity, heat resistance, and impact resistance while attaining a satisfactory balance among these by producing a propylene/ethylene block copolymer with a metallocene catalyst, which recently has come to hold an important industrial position. In all these attempts, a crystalline homopolymer of propylene or copolymer with a small amount of ethylene and a propylene/ethylene copolymer are produced by two-stage polymerization (see patent documents 1 to 4).

A great feature of metallocene catalysts resides in that the polymerization-active sites are even (single sites). Compared to Ziegler catalysts, metallocene catalysts give a narrower molecular-weight or comonomer composition distribution. Consequently, a more homogeneous and more flexible rubber ingredient is yielded to improve impact resistance. It is further thought that since compatibility with the crystalline polypropylene ingredient can also be regulated, the problem concerning heat resistance is mitigated.

However, to have a narrow composition distribution on the other hand means a reduced affinity between the crystalline polypropylene ingredient and the propylene/ethylene copolymer ingredient. This adversely influences the particle diameter and interfacial strength of the copolymer ingredient (elastomer ingredient). For the simple block copolymer production in which two ingredients, i.e., crystalline polypropylene and a copolymer ingredient, are produced by merely using a metallocene catalyst, it is currently difficult to obtain a propylene block copolymer which satisfy all of rigidity, heat resistance, impact resistance, and the like while attaining a satisfactory balance among these.

Incidentally, it is thought that for improving the rigidity, heat resistance, impact resistance, and the like of such a propylene block copolymer while well balancing these, it is necessary that sufficient impact resistance should be maintained with the copolymer ingredient and, simultaneously therewith, compatibility between the crystalline polypropylene and the copolymer ingredient should be regulated so as to be in a proper range. The problem concerning compatibility between a crystalline polypropylene ingredient and a copolymer ingredient has been encountered also in propylene/ethylene block copolymers produced hitherto with a Ziegler catalyst. A technique for enhancing compatibility between a polypropylene ingredient and copolymer parts has been known from long ago which comprises adding a compatibilizing agent ingredient for these (see patent documents 5 and 6). In this technique, a polypropylene ingredient, a propylene/ethylene copolymer ingredient, and a propylene/ethylene copolymer as a compatibilizing agent ingredient are produced by three-stage polymerization using a Ziegler catalyst.

Recently, copolymers produced by that technique while regulating the intrinsic viscosities and MFRs of the ingredients were disclosed which comprise a crystalline polypropylene ingredient, a copolymer ingredient having a relatively low ethylene content as a compatibilizing agent, and a copolymer ingredient having a relatively high ethylene content (see patent documents 7 and 8). There is a statement in these patent documents that these copolymers are excellent also in low-temperature impact resistance. It is pointed out therein that for improving a balance among properties, to regulate only the ethylene content of each ingredient is insufficient and that intrinsic viscosity, i.e., molecular weight, and MFR should also be regulated so as to be in specific ranges. However, since these prior-art techniques employ a Ziegler catalyst, they intrinsically have the problems described above concerning a wide molecular-weight distribution or composition distribution. Furthermore, it has been pointed out that an ethylene/propylene copolymer containing at least 80 wt % propylene as a compatibilizing agent ingredient improves low-temperature impact resistance (see patent document 9).

An attempt has recently been made and proposed in which a propylene resin composition containing a propylene/ethylene copolymer as a compatibilizing agent ingredient and having an excellent balance among rigidity, heat resistance, and impact resistance is produced using a metallocene catalyst through polymerization in at least three stages as in the technique described above in which a Ziegler catalyst is used (see patent document 10). However, this document merely specifies each ingredient by showing wide ranges of the component proportion and ethylene content thereof, wide ranges of the intrinsic viscosity and MFR, etc., and it is difficult to consider the document to specifically disclose a process for producing the propylene resin composition having an excellent balance among rigidity, heat resistance, and impact resistance.

Moreover, an attempt has been made to obtain a propylene resin composition having an excellent balance among rigidity, impact resistance, and heat resistance by using an elastomer and an inorganic filler in combination with a block copolymer obtained by producing crystalline polypropylene and a propylene/ethylene copolymer by two-stage polymerization using a metallocene catalyst. However, since affinity between the crystalline polypropylene ingredient and the propylene/ethylene copolymer ingredient is relatively low as stated above, there has been room for improvement in balance among rigidity, heat resistance, and impact resistance. (See patent documents 11 and 12.)

There recently is a growing desire for an improvement in low-temperature (about −30° C.) impact resistance (cold resistance) besides ordinary-temperature impact resistance in frozen-food storage/packaging materials, industrial materials for use at low temperatures, etc. Although patent documents 3, 7, and 9, which were cited above, suggest an improvement in low-temperature impact resistance, this property is not always balanced with other properties. An improvement in this property is also desired.

As described above, propylene resins, which are exceedingly important industrial resin materials, have not been sufficiently improved in rigidity, heat resistance, and impact resistance while well balancing these. In addition, low-temperature impact resistance also is not always fully satisfactory. Improvements in these are presently expected.

Patent Document 1: JP-A-8-67783 (Abstract; Claims 1, 3, and 4; and paragraphs 0002 to 0004)
Patent Document 2: JP-A-4-337308 (Abstract)
Patent Document 3: JP-A-5-202152 (Abstract)
Patent Document 4: JP-A-6-172414 (Abstract)
Patent Document 5: JP-A-57-67611 (Claim 1)
Patent Document 6: JP-A-61-152442 (Claim (1); page 2, right lower column, lines 1-2; page 3, right upper column, line 5 from bottom to left lower column, line 2; and page 4, Example 1)
Patent Document 7: JP-A-2003-327642 (Abstract; Claim 1; and paragraph 0021)
Patent Document 8: JP-A-9-48831 (Abstract)
Patent Document 9: JP-T-2002-501555 (Abstract; Claim 1; and page 11, lines 9-10) (The term "JP-T" as used herein means a published Japanese translation of a PCT patent application.)
Patent Document 10: WO95/27741 (Abstract; Claim 1; and page 49, lines 1-3)
Patent Document 11: JP-A-10-1573 (Abstract)
Patent Document 12: JP-A-2003-147158 (Abstract)

DISCLOSURE OF THE INVENTION

Subjects that the Invention is to Accomplish

Subjects to be accomplished by the invention are to improve the rigidity, heat resistance, and impact resistance of a propylene resin material while maintaining a satisfactory balance among these and to further improve the low-temperature impact resistance thereof, by using a process for producing a propylene resin composition through three-stage polymerization or by utilizing a blending step.

Means for Accomplishing the Subjects

In order to accomplish those subjects, the present inventors made detailed investigations from many standpoints on the kind of polymerization catalyst and polymerization conditions in three-stage polymerization or the like, proportion and ethylene content of each ingredient in a composition, values of various properties including molecular weight and glass transition temperature of the ingredient, changes of composition properties with combinations of values of those properties, etc. The present inventors repeatedly tried and made experimental comparisons and demonstrations. As a result, the present inventors could understand that in three-stage polymerization for producing a propylene resin composition comprising a propylene polymer and propylene/ethylene copolymers or in a composition of these three ingredients, essentially important matters are to use a metallocene catalyst, to regulate the proportion and ethylene content of each ingredient so as to be in specific ranges, etc. The invention has been thus made.

Specifically, the invention can be achieved by producing a propylene resin composition by, e.g., conducting the three-stage polymerization method using a metallocene catalyst or blending three ingredients, while combining a crystalline polypropylene having specific properties, a propylene/ethylene copolymer ingredient having a relatively high ethylene content [sometimes referred to as elastomer], and a compatibilizing agent ingredient which is a specific copolymer having a relatively low ethylene content (ingredient for improving solubility between the crystalline propylene polymer and the propylene/ethylene copolymer having a relatively high ethylene content), and regulating the ethylene content and other properties of each ingredient, etc.

The propylene resin composition of the invention basically comprises 60-95 wt % crystalline propylene polymer ingredient (a) comprising a propylene homopolymer ingredient or a copolymer of propylene and up to 3 wt % ethylene or an α-olefin having 4-20 carbon atoms and 40-5 wt % propylene/ethylene copolymer ingredient (b), the ingredients being ones obtained by polymerization using a metallocene catalyst. In this resin composition, the ingredient (b) comprises two ingredients, the amount ratio between the two ingredients and ethylene contents thereof are specified, and the melting point obtained by differential scanning calorimetry (DSC) and the proportion of the copolymer ingredient determined by TREF are specified.

The rationality and significance of the basic requirements in such constitution of the invention have been demonstrated by comparisons between the Examples and Comparative Examples which will be given later.

Additional requirements with which the invention can be specified include the tan δ peak temperature attributable to the propylene/ethylene copolymer ingredient (b) obtained by solid viscoelasticity measurement, weight-average molecular weight of each ingredient, selection of the metallocene catalyst to be used for polymerization, employment of an elastomer (rubber ingredient) as another ingredient, etc.

Incidentally, the patent documents cited above and other prior-art patent documents were searched with respect to a propylene resin composition which contains a compatibilizing agent and is obtained, for example, by three-stage polymerization using a metallocene catalyst, which is one of the basic requirements in the invention. Of documents including a statement specifically relevant to the present invention, patent document 1 (JP-A-8-67783) relates to the invention of a propylene resin composition produced by two-stage polymerization using a metallocene catalyst. In paragraph 0013 in this document, there is a statement to the effect that an ethylene copolymer as a dispersion promoter (compatibilizing agent as a third ingredient) produced with a metallocene catalyst may be added in multistage polymerization. Although the patent document includes this statement, any specific statement, Example, or the like concerning three-stage polymerization with a metallocene catalyst cannot be found therein. Such a statement is found also in patent document 9, page 11, lines 16 to 27.

Patent document 10 (WO95-27741) specifically describes a propylene resin composition which contains a compatibilizing agent and is produced by three-stage polymerization using a metallocene catalyst. This document describes "A process for producing a propylene resin composition which comprises 20-90 wt % propylene (co)polymer ingredient having a melting point of 100° C. or higher and an MFR (230° C., 2.16-kg load) of 0.01-1,000 g/10 min and containing at least 80 mol % propylene, 5-75 wt % propylene/olefin copolymer ingredient containing 50 mol % or more propylene and having an intrinsic viscosity in the range of 0.1-20 dL/g, and 5-75 wt % ethylene/olefin copolymer ingredient containing 50 mol % or more ethylene and having an intrinsic viscosity in the range of 0.1-20 dL/g and which has an MFR of 0.01-500 g/10 min." (summary of claim 1 in pages 97-98). This document includes statements concerning an improvement in impact resistance with a compatibilizing agent (page 49, lines 1-3) and the glass transition temperatures of two ingredients (page 51, line 1 and page 53, line 7). However, the contents of the description in this document mostly are detailed explanations on catalyst ingredients and surrounding matters, etc., and almost no statement concerning the essence of that invention can be found.

The essence of the invention disclosed in patent document 10 is to produce a composition using a metallocene catalyst in place of a Ziegler catalyst and to specify wide ranges of intrinsic viscosity, MFR, etc. together with wide ranges of the proportion and ethylene content of each ingredient. However, it is difficult to consider that the document specifically and clearly discloses the process for producing a propylene resin composition having an excellent balance among rigidity, heat resistance, and impact resistance.

On the other hand, the present invention has definite requirements for specific constitutions in a propylene resin composition and produces a marked effect, for example, that low-temperature impact resistance is improved in a propylene resin composition having an excellent balance among rigidity, heat resistance, and impact resistance. In conclusion, those statements in the prior-art document can be considered to neither suggest nor indicate the present invention.

The present inventors successively continued investigations. As a result, they found that by incorporating an elastomer and an inorganic filler as additional ingredients into that resin composition and combining these, the composition is further sufficiently improved in rigidity, heat resistance, and impact resistance while maintaining a satisfactory balance among these properties and is sufficiently improved also in low-temperature impact resistance.

Furthermore, the present inventors have found that by utilizing that resin composition as an impact modifier, selecting as a main ingredient a propylene block copolymer produced by polymerization using a Ziegler catalyst, and incorporating and combining an elastomer and an inorganic filler as additional ingredients, a propylene resin material can be obtained in which not only the rigidity, heat resistance, and impact resistance have been sufficiently improved while well balancing these but also molded-article appearance, in particular, flow mark performance of molded articles, have been improved and low-temperature impact resistance has also been improved.

How the present invention has been made, the specific constitutions and main features of the invention, comparisons with relevant prior-art techniques, etc. have been summarized above. The following is a summary of the whole constitutions of the invention. The present invention is constituted of the following groups of invention units. The subject matter described under [1] is the basic invention, and the inventions [2] to [7] are ones constituted by adding additional requirements to the basic invention or are embodiments of the basic invention.

The inventions [8] to [12] are embodiments which are: a resin composition obtained by adding an elastomer and optionally further adding an inorganic filler to the resin compositions [1] to [7] as a base; and a molded article obtained from that resin composition.

The inventions [13] and [14] are embodiments in which the resin compositions [1] to [7] are used as an impact modifier.

[1] A propylene resin composition comprising:

60-95 wt % of a crystalline propylene polymer ingredient (a) comprising a propylene homopolymer ingredient or a copolymer of propylene and up to 3 wt % ethylene or an α-olefin having 4-20 carbon atoms; and 40-5 wt % of a propylene/ethylene copolymer ingredient (b), wherein the ingredients are polymerized using a metallocene catalyst, and the composition satisfies the following properties i) to iv):

i) A melting point obtained by differential scanning calorimetry (DSC) is 156° C. or higher, ii) A proportion of the copolymer ingredient (b) determined by a temperature rising elution fractionation (TREF) fractionating at three levels of temperature of 40° C., 100° C., and 140° C., is 5-40 wt %, iii) An ethylene content of the copolymer ingredient (b) determined by a temperature rising elution fractionation (TREF) fractionating at three levels of temperature of 40° C., 100° C., and 140° C., is 30-50 wt %, and an average ethylene content in components eluting at 40-100° C. is 10 wt % or lower, and iv) The propylene/ethylene copolymer ingredient (b) comprises at least two kinds of propylene/ethylene copolymer ingredients (b-1) and (b-2), each of which differs in ethylene content, wherein an ethylene content of the ingredient (b-1) and an ethylene content of the ingredient (b-2) are 15-30 wt % and 40-55 wt %, respectively, and the ratio of the amount of ingredient (b-1) to that of ingredient (b-2), (b-1):(b-2), is in the range of from 1:99 to 40:60.

[2] The propylene resin composition as in [1], which satisfies the following property v):

v) A tan δ peak temperature attributable to the propylene/ethylene copolymer ingredient (b) obtained by a solid viscoelasticity measurement in the range of −80 to 150° C. under the condition of a frequency of 1 Hz, is present at −47° C. or lower.

[3] The propylene resin composition as in [1] or [2], wherein the ingredient (b-1) and ingredient (b-2) in the propylene/ethylene copolymer each has a weight-average molecular weight of 250,000-1,000,000, and the ingredient (a) has a weight-average molecular weight of 60,000-250,000.

[4] The propylene resin composition as in any one of [1] to [3], wherein a weight-average molecular weight of the ingredient (b-1) in the propylene/ethylene copolymer is not lower than a weight-average molecular weight of the ingredient (b-2) in the propylene/ethylene copolymer.

[5] The propylene resin composition as in any one of [1] to [4], wherein each of the ingredients is produced by sequential multistage polymerization, or the ingredients separately obtained by polymerization are mixed together, or the ingredients are produced by a combination of these processes.

[6] The propylene resin composition as in any one of [1] to [5], wherein the ingredients (a) and (b) are produced in the presence of a metallocene catalyst comprising: (A) a transition metal compound represented by the following general formula [I]; and (B) at least one kind of activators selected from the group consisting of (B-1) an organic aluminumoxy compound, (B-2) a compound capable of reacting with a transition metal compound to form a cation, and (B-3) an ion-exchangeable layered compound:

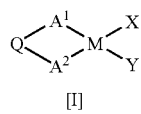

[I]

(In general formula [I], $A^1$ and $A^2$ represent a conjugated five-membered ring ligand [$A^1$ and $A^2$ in the same compound may be the same or different] and the carbon atoms in each conjugated five-membered ring which are not bonded to the bonding group Q may have a substituent; Q represents a bonding group which bridges the two conjugated five-membered ring ligands in any position; M represents an atom of a metal selected from Groups 4 to 6 of the periodic table; and X and Y each independently represents a hydrogen atom, halogen atom, hydrocarbon group, amino group, halogenated hydrocarbon group, oxygen-containing hydrocarbon group, nitrogen-containing hydrocarbon group, phosphorus-containing hydrocarbon group, or silicon-containing hydrocarbon group, which are bonded to the M.)

[7] The propylene resin composition as in any one of [1] to [6], which shows a synergistically enhanced impact resistance depending on the proportion of the propylene/ethylene copolymer ingredient (b-1) to ingredient (b-2).

[8] A propylene resin composition comprising: 100 parts by weight of the propylene resin composition as in any one of [1] to [7]: and 1-70 parts by weight of an ethylene/α-olefin elastomer or styrene elastomer.

[9] The propylene resin composition as in [8], which comprises 1-500 parts by weight of an inorganic filler as ingredient (III) per 100 parts by weight of the ingredient (I).

[10] The propylene resin composition as in [9], wherein the inorganic filler is talc.

[11] The propylene resin composition as in any one of [8] to [10], which has a flexural modulus of 800 MPa or higher and a Charpy impact value at −30° C. of 6.1 kJ/m² or higher.

[12] A molded article obtained by injection-molding the propylene resin composition as in [11].

[13] A polyolefin resin composition comprising:
 100 parts by weight of a resin composition comprising: 45-85 wt % of propylene block copolymer, as ingredient (IV), which has an MFR (230° C., 21.18-N load) of 15-200 g/10 min and is polymerized using a Ziegler catalyst; and 55-15 wt % of ethylene/α-olefin elastomer or styrene elastomer as ingredient (II); and
 12-75 parts by weight of the resin composition as in any one of [1] to [7] as ingredient (I).

[14] The polyolefin resin composition as in [13], which comprises 1-125 parts by weight of an inorganic filler as ingredient (III) per 100 parts by weight of the sum of the ingredient (IV) and ingredient (II).

Advantages of the Invention

The invention can sufficiently improve the rigidity, heat resistance, and impact resistance of a propylene resin composition while well balancing these and can further improve low-temperature (about −30° C.) impact resistance. In addition, the invention produces a remarkable effect that by using two propylene/ethylene copolymer ingredients in a specific proportion, the impact resistance is synergistically enhanced.

BEST MODE FOR CARRYING OUT THE INVENTION

An outline of the present invention and skeletal constitutions of the invention were summarized above. Embodiments of the invention are hence described below in detail in order to explain each invention group.

1. Propylene Resin Composition (Ingredient (I))

(1) Basic Definition of the Propylene Resin Composition i) Components

The resin composition (ingredient (I)) of the invention is basically defined as a propylene resin composition which comprises 60-95 wt % crystalline propylene polymer ingredient (a) comprising a propylene homopolymer ingredient or a copolymer of propylene and up to 3 wt % ethylene or an α-olefin having 4-20 carbon atoms and 40-5 wt % propylene/ethylene copolymer ingredient (b), the ingredients being ones obtained by polymerization using a metallocene catalyst. This definition does not exclude the incorporation of other ingredients.

ii) Melting Point

From the standpoint of the rigidity and heat resistance of the composition, the melting point of the propylene resin composition preferably is higher and is characterized by being 156° C. or higher. The melting point thereof is preferably 157° C. or higher, more preferably 158° C. or higher. For heightening the melting point of a propylene resin composition, it is generally necessary to select catalyst ingredients or polymerization conditions which yield a propylene resin having high stereoregularity. For example, this can be attained by using the preferred catalyst ingredients which will be described later.

In the invention, melting point means one obtained with a differential scanning calorimetry (DSC). A 5.0-mg sample is weighed out and held at 200° C. for 5 minutes. Thereafter, the sample is cooled to 40° C. at a rate of 10° C./min to cause crystallization and eliminate the thermal history thereof. This sample is then melted by heating at a rate of 10° C./min to obtain a melting curve. The peak temperature in the curve is taken as the melting point. In the case of a resin composition in which two or more melting points are observed, that observed at the highest temperature is taken as the melting point of this resin composition.

Although there is no particular need of specifying an upper limit of the melting point, it is difficult to actually produce a resin composition having a melting point higher than 180° C.

(2) Crystalline Propylene Polymer Ingredient (a)

A feature of the propylene resin composition of the invention resides in that it is excellent in rigidity and heat resistance. From this standpoint, the crystalline propylene polymer ingredient (a) (in the case of production by multistage polymerization, the ingredient is, for example, one produced by first-stage polymerization) should contain 97 wt % or more propylene. The ingredient (a) preferably is a polymer containing 99 wt % or more propylene, and most preferably is a propylene homopolymer.

(3) Propylene/Ethylene Copolymer Ingredient (b)

i) Proportion

For the purpose of imparting impact resistance to the propylene resin composition of the invention, the proportion of the propylene/ethylene copolymer ingredient (b) to the whole composition (in the case of production by multistage polymerization, the proportion by weight of, e.g., the sum of the ingredients produced by second-stage and subsequent polymerization) is regulated to 40-5 wt %. The proportion thereof is preferably 39-6 wt %, more preferably 38-7 wt %. Consequently, the proportion of the crystalline polypropylene ingredient is in the range of 60-95 wt %, preferably 61-94 wt %, more preferably 62-93 wt %. In case where the content of the copolymer ingredient exceeds that range, the composition is poor in rigidity and heat resistance. In case where it is lower than the lower limit, the composition has poor impact resistance.

ii) Determination of Proportion and Ethylene Content (TREF)

ii-1) Method of TREF

The proportion of the copolymer ingredient (b) may be calculated from a material balance in polymerization. However, it can be determined in more detail by temperature rising elution fractionation (TREF).

The technique of evaluating the crystallinity distribution of a block copolymer by TREF is well known to persons skilled in the art. Detailed methods of analysis are shown, for example, in the following documents.

G. Glockner, *J. Appl. Polym. Sci.; Appl. Polym. Symp.*; 45, 1-24 (1990)

L. Wild, *Adv. Polym. Sci.*; 98, 1-47 (1990)

J. B. P. Soares, A. E. Hamielec, *Polymer;* 36, 8, 1639-1654 (1995)

In TREF, components having lower crystallinity are eluted at lower temperatures and ones having higher crystallinity are eluted at higher temperatures. Consequently, what distribution the crystallinity of a polypropylene resin has can be precisely grasped.

ii-2) Determination by TREF

In the technique of TREF in the invention, fractions separated are analyzed with an apparatus comprising a combination of GPC and FT-IR specifically in the manner shown below, whereby the molecular weight and ethylene content of each fraction can be simultaneously determined and values (indexes) of various properties of the propylene resin composition can be determined. Although details of this technique are described in JP-A-2003-147035, the specific procedure will be briefly described below.

a. Analytical Apparatus to be Used

[Cross Fractionation Apparatus]

CFC T-100 (abbreviated to CFC), manufactured by Dia Instruments Co., Ltd.

[Fourier Transformation Infrared Absorption Spectrum Analysis]

FT-IR: 1760X, manufactured by Perkin Elmer Corp.

The wavelength-fixed infrared spectrophotometer attached as a detector of the CFC is removed, and the FT-IR is connected in place of it. This FT-IR is used as a detector. The transfer line through which solutions discharged from the CFC are transferred from the outlet to the FT-IR is regulated so as to have a length of 1 m and the temperature thereof is kept at 140° C. throughout the examination. As the flow cell attached to the FT-IR, one having an optical-path length of 1 mm and an optical-path width of 5 mmΦ is used. The temperature of the flow cell is kept at 140° C. throughout the examination.

[Gel Permeation Chromatography (GPC)]

As a GPC column after the CFC, use is made of serially connected three columns of AD806MS, manufactured by Showa Denko K.K.

b. CFC Examination Conditions

Solvent: o-dichlorobenzene (ODCB)

Sample concentration: 4 mg/mL

Injection amount: 0.4 mL

Crystallization: cooling from 140° C. to 40° C. over about 40 minutes.

Fractionation method: Fractionation temperatures in the temperature-rising elution fractionation of 40, 100, and 140° C. are used to separate a sample into three fractions in total. The proportions (unit: wt %) of components eluted at temperatures of 40° C. and lower (fraction 1), components eluted at 40-100° C. (fraction 2), and components eluted at 100-140° C. (fraction 3) are defined as $W_{40}$, $W_{100}$, and $W_{140}$, respectively. $W_{40}+W_{100}+W_{140}$ is 100. Each of the fractions separated is automatically transported as it is to the FT-IR analyzer.

Solvent flow rate during elution: 1 mL/min c. FT-IR Examination Conditions

After a sample solution has begun to be discharged from the GPC after the CFC, an FT-IR examination is conducted under the following conditions. Thus, GPC-IR data for the fractions 1 to 3 are obtained.

Detector: MCT

Resolution: 8 $cm^{-1}$

Examination interval: 0.2 min (12 sec)

Number of integrations per examination: 15 d. Postprocessing and Analysis of Examination Results

The amount and molecular-weight distribution of the components eluted at each temperature are determined while using as a chromatogram the absorbances at 2,945 $cm^{-1}$ obtained by the FT-IR. The amount of the components eluted is standardized so that the total of the components eluted is 100%. Conversion of a retention volume to a molecular weight is made with a calibration curve drawn beforehand using standard polystyrenes.

For conversion to a molecular weight, a general calibration curve is used with reference to Sadao Mori, *Saizu Haijo Kuromatografi* (Kyoritsu Shuppan Co., Ltd.). The following numerical values are used in the viscosity formula ($[\eta]=K \times M^{\alpha}$) to be used in the conversion.

[In Drawing of Calibration Curve Using Standard Polystyrenes]

$$K=1.38 \times 10^{-4}\ \alpha=0.70$$

[In Examination of Propylene/Ethylene Block Copolymer Sample]

$$K=1.03 \times 10^{-4}\ \alpha=0.78$$

In determining the ethylene content distribution (distribution of ethylene content along a molecular-weight axis) of the components of each fraction, the ratio between the absorbance at 2,956 $cm^{-1}$ and absorbance at 2,927 $cm^{-1}$ obtained by GPC-IR is used. That ratio is converted to an ethylene content (wt %) with calibration curves drawn beforehand using polyethylene, polypropylene, ethylene/propylene rubbers (EPR) whose ethylene contents had been known through $^{13}$C-NMR spectroscopy or the like, and mixtures thereof. Thus, the ethylene content distribution is determined.

ii-3) Theoretical Calculation of Copolymer Content

The content of the copolymer ingredient (b) in the propylene resin composition of the invention is defined by the following formula (F1), and is determined by the following procedure.

Content of copolymer ingredient (wt %)=$W_{40} \times A_{40}/B_{40} + W_{100} \times A_{100}/B_{100}$ (F1)

$W_{40}$ and $W_{100}$ are the properties (unit: wt %) of the respective fractions eluted. $A_{40}$ and $A_{100}$ are the average ethylene contents (unit: wt %) in the fractions respectively corresponding to $W_{40}$ and $W_{100}$. $B_{40}$ and $B_{100}$ are the ethylene contents (unit: wt %) of the copolymer ingredients respectively contained in the fractions. Methods for determining $A_{40}$, $A_{100}$, $B_{40}$, and $B_{100}$ will be described later.

The meaning of formula (F1) is as follows. The first term in the right side of formula (F1) is a term for calculating the amount of the copolymer contained in fraction 1 (part soluble at 40° C.). In case where fraction 1 contains the copolymer only and does not contain PP (propylene polymer), $W_{40}$ as it is contributes to the content of the copolymer derived from fraction 1 in the whole. However, since fraction 1 contains a small amount of PP-derived components (components having an extremely low molecular weight and atactic polypropylene) besides components derived from the copolymer, it is necessary to correct that part. This is accomplished by multiplying $W_{40}$ by $A_{40}/B_{40}$ to thereby calculate the amount derived from the copolymer ingredient in fraction 1. The operation of multiplying by $A_{40}/B_{40}$ in the first term in the right side means to calculate the contribution of the copolymer from the amount by wt % of fraction 1 ($W_{40}$). The same applies to the second term in the right side. The amounts of copolymer contribution in the respective fractions are calculated, and the sum of these is the content of the copolymer.

ii-4) Actual Determination of Copolymer Content

The average ethylene contents $A_{40}$ and $A_{100}$ of fractions 1 to 3 are obtained by multiplying the weight proportion for each of data points in the chromatogram of 2,945 cm$^{-1}$ absorbance by the ethylene content (obtained from the ratio of absorbance at 2,956 cm$^{-1}$ to absorbance at 2,927 cm$^{-1}$) for the corresponding data point and totaling the products.

The ethylene content corresponding to the peak position in a differential molecular-weight distribution curve for fraction 1 is referred to as $B_{40}$ (unit is wt %). On the other hand, $B_{100}$ is approximated at 100 ($B_{100}$=100) because $B_{100}$ has crystallinity derived from ethylene segments and because the amount of the copolymer contained in these fractions is smaller than the amount of the copolymer contained in fraction 1.

Consequently, the content of the copolymer ingredient (b) can be determined according to the following formula (F2)

Content of copolymer ingredient (wt %)=$W_{40} \times A_{40}/B_{40} + W_{100} \times A_{100}/100$ (F2)

Namely, the first term in the right side of formula (F2), i.e., $W_{40} \times A_{40}/B_{40}$, indicates the content (wt %) of copolymer components having no crystallinity, and $W_{100} \times A_{100}/100$ as the second term indicates the content (wt %) of copolymer components having crystallinity.

The ethylene content in the copolymer ingredient is determined with the following formula (F3) from the copolymer ingredient content determined with formula (F2).

Ethylene content in copolymer ingredient (wt %)= $(W_{40} \times A_{40} + W_{100} \times A_{100})$/[copolymer ingredient content] (F3)

The meaning of the use of the three fractionation temperatures is as follows. In the CFC analysis in the invention, 40° C. means temperature conditions which are necessary and sufficient for fractionating only polymers having no crystallinity (e.g., most of the copolymer ingredient or those components of the propylene polymer ingredient (PP) which are components having an extremely low molecular weight and atactic components). 100° C. is a temperature which is necessary and sufficient for eluting only components which are insoluble at 40° C. but soluble at 100° C. (e.g., those components of the copolymer ingredient which have crystallinity due to ethylene and/or propylene segments and lowly crystalline PP). 140° C. is a temperature which is necessary and sufficient for eluting only components which are insoluble at 100° C. but soluble at 140° C. (e.g., those components of the PP which have especially high crystallinity and those components of the copolymer ingredient which have an extremely high molecular weight and have ethylene crystallinity) and for recovering the whole of the propylene resin composition used for the analysis.

iii) Ethylene Content

The ethylene content in the copolymer ingredient (b) may be determined from a material balance in polymerization. However, it is preferred to determined the ethylene content also by the method described above. From the standpoint of imparting low-temperature impact resistance to the block copolymer, the range of the content should be 30-50 wt %. The ethylene content therein is in the range of preferably 32-47 wt %, more preferably 35-43 wt %. In case where the ethylene content is lower than that range, the block copolymer has poor impact resistance at low temperatures. In case where it exceeds the upper limit, compatibility between the PP ingredient and the copolymer ingredient becomes too low, resulting in poor impact resistance in this case also.

(4) Properties of Ethylene Contents and Proportions of Two Copolymer Ingredients i) Basic Properties An essential feature of the propylene resin composition of the invention resides in that the propylene/ethylene random copolymer ingredient (b) comprises at least two propylene/ethylene random copolymer ingredients differing in ethylene content and the two copolymer ingredients have a specific ethylene content ratio and specific proportions.

The copolymer ingredient (b) comprises two essential ingredients, i.e., a copolymer ingredient (b-2) comprising a propylene/ethylene copolymer having a relatively high ethylene content and a compatibilizing agent ingredient (b-1) comprising a propylene/ethylene copolymer having a relatively low ethylene content. As long as the other various requirements are satisfied, ingredient (b-1) and ingredient (b-2) each may be a composition composed of two or more ingredients. From the standpoint of production cost, however, the propylene resin composition of the invention preferably is composed of three ingredients, i.e., the crystalline propylene ingredient, the compatibilizing agent ingredient having a low ethylene content, and the copolymer ingredient having a high ethylene content.

In order to improve a balance among overall properties of the propylene resin composition, the ethylene contents and proportions of ingredients (b-1) and (b-2) in the copolymer ingredient are specified in more detail. Ingredient (b-2) is a copolymer ingredient necessary for imparting low-temperature impact resistance to the propylene resin composition, while ingredient (b-1) is a compatibilizing agent ingredient for the propylene polymer ingredient and the high-ethylene content. Especially in the case of using a metallocene catalyst as in the invention, the copolymer has a narrower molecular-weight distribution and a narrower composition distribution than in the case of using a Ziegler catalyst and, hence, a compatibilizing agent ingredient is more important. The compatibilizing agent ingredient is especially required to be specified by more precise characteristic values (indexes).

ii) Specification by Ethylene Content

Based on the consideration given above, ingredient (b-1) as a compatibilizing agent ingredient in the propylene resin composition of the invention is characterized by having an ethylene content of 15-30 wt %. The ethylene content thereof is preferably in the range of 15-25 wt %. In case where the ethylene content thereof is lower than that range, this ingredient has poor compatibility with ingredient (b-2). In case where the ethylene content thereof exceeds the upper limit, this ingredient has poor compatibility with ingredient (a). In either case, this ingredient (b-1) cannot fully exhibit its performance as a compatibilizing agent.

JP-T-2002-501555 (patent document 9) cited as a prior-art document discloses an ethylene/propylene copolymer having a propylene content of at least 80 wt % as a compatibilizing agent ingredient. A close investigation on the contents thereof revealed that the compatibilizing agent ingredient has an ethylene content in the range of relatively small numerical values, i.e., 8.5-13 wt %. In page 23 of the description of the document and in FIG. 3 thereof, there is an explanation to the effect that the state of a failure in an impact test in the case where the compatibilizing agent ingredient has been added is elongated rubber particles accompanied by no sign of cavitation. It is presumed from these results that the compatibilizing agent ingredient is contained mainly in the propylene homopolymer as a matrix and modifies the properties thereof so as to make it more plastic. However, such a compatibilizing agent ingredient having too low an ethylene content enhances the adverse effect that it dissolves in the polypropylene as a matrix to thereby reduce rigidity. In addition, this compatibilizing agent ingredient has a high glass transition temperature because of the too low ethylene content and, as a result, an improvement of the impact strength especially at low temperatures of the composition as a whole is not attained. Namely, the compatibilizing agent ingredient preferably is an ingredient which has some degree of affinity for each of the crystalline propylene polymer as a matrix (ingredient (a) in the present invention) and the copolymer having a high ethylene content (ingredient (b-2) in the present invention) and, despite this, does not completely dissolve in each of these. From this standpoint, the lower limit of the ethylene content of ingredient (b-1) as a compatibilizing agent ingredient in the present invention should be 15 wt %.

Whether the compatibilizing agent ingredient has dissolved preferentially in the crystalline propylene polymer ingredient as a matrix can be judged based on a measurement of the glass transition temperature of the whole composition. When a compatibilizing agent ingredient has an ethylene content in the range specified in the invention, this compatibilizing agent ingredient only slightly dissolves in the crystalline propylene polymer ingredient and, hence, the glass transition temperature of the crystalline propylene polymer does not considerably differ from that in the case where no compatibilizing agent ingredient has been incorporated. On the other hand, in case where the ethylene content of the compatibilizing agent ingredient is lower than the range according to the invention, this compatibilizing agent ingredient mostly dissolves in the crystalline propylene polymer and, hence, the glass transition temperature of the crystalline propylene polymer measured is lower by several degrees (° C.) than in the case described above. Incidentally, the glass transition temperature of a crystalline propylene polymer is defined as the position of the peak observed in the temperature range of about −10 to 10° C. in a loss tangent-temperature profile obtained from a dynamic mechanical analysis in solid state (DMA). The phenomena described above are manifested by comparisons between the Examples and the Comparative Examples in Table 6 which will be given later.

Ingredient (b-2) is characterized by having an ethylene content of 40-55 wt %. The ethylene content thereof is in the range of preferably 41-53 wt %, more preferably 42-50 wt %. In case where the ethylene content thereof is outside that range, this copolymer ingredient has an elevated glass transition temperature and sufficient low-temperature impact resistance cannot be obtained.

The ethylene content is regulated by regulating the ethylene feed amount in the polymerization reaction or selecting a blending ingredient.

iii) Specification by Proportions of Two Ingredients

The ratio of the amount of ingredient (b-1) to that of ingredient (b-2), (b-1):(b-2), desirably is from 1:99 to 40:60 from the standpoint of property balance. That ratio is in the range of preferably from 5:95 to 35:65, more preferably from 10:90 to 30:70. In case where the proportion of ingredient (b-1) is lower than that range, this copolymer ingredient has a reduced effect as a compatibilizing agent and sufficient impact resistance is not obtained at ordinary temperature and at low temperatures. In case where the proportion thereof exceeds that range, the content of (b-2) is too low and this impairs low-temperature impact resistance. Such proportions of ingredient (b-2) are therefore undesirable.

The ethylene contents and proportions of ingredients (b-1) and (b-2) can be determined in the following manners. In the case where ingredients (a), (b-1), and (b-2) are separately produced and then kneaded together to obtain a resin composition, the ethylene content of each ingredient is determined beforehand and the proportions of the ingredients can be regulated by regulating the kneading amount ratio. In the case of production through multistage polymerization, the ethylene contents and proportions thereof can be determined by a material balance in the polymerization step or through the analysis of samples taken out during the polymerization or through the examination thereof by TREF-IR described above.

(5) Specification of Polymerization Catalyst

In producing the block copolymer of the invention, it is necessary to precisely regulate indexes concerning the ethylene contents and proportions of the two copolymer ingredients and specification of others. For attaining this, it is necessary to produce the copolymer with a metallocene catalyst, which yields polymers having an arrow molecular-weight distribution and copolymers having a narrow composition distribution. A merit concerning properties in the case of producing the block copolymer with a metallocene catalyst is that ingredient (b) has almost no structures derived from the crystallinity of polyethylene which exert an adverse influence on impact resistance. Consequently, the block copolymer in the invention is characterized in that the average ethylene content $A_{100}$ in the components eluted at 40-100° C. in the TREF conducted by the method described above is 10 wt % or lower. The average ethylene content thereof is preferably 5 wt % or lower, more preferably 1 wt % or lower.

(6) Glass Transition Temperature (Tan δ Peak Temperature)

From the standpoint of low-temperature impact resistance, the propylene resin composition as a whole should be one in which the copolymer ingredient has a sufficiently low glass transition temperature. It is necessary to specify the glass transition temperature besides the average ethylene content of the copolymers.

In the propylene resin composition of the invention, the glass transition temperature of the copolymer ingredient obtained by a solid viscoelasticity measurement (so-called tan δ peak temperature) is preferably −47° C. or lower, more preferably −49° C. or lower. In case where the glass transition temperature thereof is higher than that, this resin composition has poor low-temperature impact resistance. Although there is no particular need of specifying a lower limit of the glass transition temperature, it may be difficult to actually produce a propylene resin composition having a glass transition temperature of −70° C. or lower.

In the solid viscoelasticity measurement of the block copolymer, a glass transition temperature attributable to non-crystalline parts of the crystalline PP and a glass transition temperature attributable to the copolymer ingredient are observed at around −10 to 10° C. and at a temperature lower than that (generally at −10° C. or lower), respectively. However, the term glass transition temperature herein means that attributable to the copolymer ingredient. In the case where two or more glass transition temperatures attributable to the copolymer ingredient are observed, that observed at a lower temperature is taken as that glass transition temperature.

(7) Specification of Molecular Weight i) Specification of Each Ingredient by Molecular Weight Ingredient (b-1) and ingredient (b-2) each preferably have a weight-average molecular weight (Mw) in the range of 250,000-1,000,000. The weight-average molecular weight thereof is in the range of more preferably 270,000-900,000, even more preferably 300,000-800,000. In case where the molecular weight thereof is lower than that range, the resin composition is poor in impact resistance and rigidity. In case where it exceeds the upper limit, the resin composition has a problem that hard spots or bright spots generate.

From the standpoint of impact resistance, it is preferred that the weight-average molecular weight of ingredient (b-1) should be not lower than the weight-average molecular weight of ingredient (b-2). The reasons for this have not been elucidated. It is, however, thought that since ingredient (b-1) functions as a compatibilizing agent ingredient to reinforce the interface between ingredient (a) and ingredient (b-2), use of ingredient (b-1) having a higher molecular weight enables interlacing to occur in a larger amount between ingredients (a) and (b-2) and can further enhance interfacial strength.

With respect to the range of the weight-average molecular weight of ingredient (a), the molecular weight thereof is desirably lower than that of ingredient (b), preferably 250,000 or lower, from the standpoint of imparting flowability necessary for molding to the block copolymer. The molecular weight thereof is preferably 60,000 or higher because too low molecular weights result in embrittlement. A more preferred range thereof is 220,000-70,000, and an even more preferred range thereof is 200,000-80,000.

ii) Determination of Molecular Weight

In the invention, weight-average molecular weight means one determined by gel permeation chromatography (GPC) in which an examination is made at a temperature of 140° C. using o-dichlorobenzene as a solvent. Conversion to molecular weight is made with standard polystyrene samples.

The molecular weight of each ingredient can be determined in the following manners. In the case of production through kneading, the molecular weights of the ingredients can be determined through an examination of each ingredient for molecular weight. In the case of production by multistage polymerization, the molecular weight of each ingredient may be determined through calculation from the results of a GPC analysis of a sample drawn out during the polymerization or determined from molecular-weight data in the TREF-GPC-IR examination described above.

In the TREF-GPC-IR examination, a polymer is fractionated into components eluted at 40, 100, and 140° C. and the average molecular weight and molecular-weight distribution of each fraction can be calculated. For precisely defining the molecular weight of a copolymer, it would be proper to make a calculative correction concerning low-molecular or low-regularity polypropylene components present in the 40° C.-soluble part and copolymer components dissolving at temperatures exceeding 40° C. However, in the case of producing a block copolymer through polymerization using a metallocene catalyst, most of the copolymer components are present in the 40° C.-soluble ingredient and the amount of low-molecular or low-regularity polypropylene components yielded is extremely small. Because of this, the calculative correction may be omitted.

Consequently in the invention, when the molecular weight of a copolymer is to be determined through the TERF-GPC examination, the weight-average molecular weight of the 40° C.-soluble part is defined, without making any correction, as the weight-average molecular weight of the copolymer ingredient.

With respect to the weight-average molecular weight of the propylene polymer ingredient, it is necessary to make a calculative correction concerning the components of the polypropylene polymer ingredient which are eluted at 40° C. and 100° C. This can be additively determined when the weight-average molecular weight of the whole composition, weight-average molecular weight of the copolymer ingredient, and content of the propylene resin ingredient are known.

2. Production of Polypropylene Resin Composition (1) Metallocene Catalyst

As stated hereinabove, the resin composition of the invention preferably is one in which all the ingredients thereof are produced with a metallocene catalyst. However, from the standpoint that a metallocene copolymer having a higher melting point and excellent in heat resistance and rigidity is industrially produced at low cost while attaining satisfactory handleability, it is preferred to use the catalyst disclosed below, which comprises as essential ingredients [A] a transition metal compound represented by the following general formula [I] and [B] one or more activators selected from the group consisting of (B-1) organic aluminumoxy compounds, (B-2) compounds capable of reacting with the transition metal compound to form a cation, and (B-3) ion-exchangeable layered compounds (including silicates) and which may contain [C] an organoaluminum compound as an optional ingredient. Most preferred of such catalysts is a catalyst comprising ingredients [A] and (B-3) and the organoaluminum compound as an optional ingredient.

i). [A] Transition Metal Compound

The transition metal compound to be mainly used in the invention is a metallocene complex represented by the following formula.

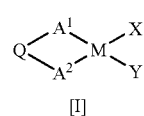

[Ka-3]

[I]

In general formula [I], $A^1$ and $A^2$ represent a conjugated five-membered ring ligand ($A^1$ and $A^2$ in the same molecule may be the same or different). The conjugated five-membered ring ligands $A^1$ and $A^2$ may have one or more substituents on the carbon atoms not bonded to the bonding group Q.

Typical examples of the conjugated five-membered ring ligands include a cyclopentadienyl group. This cyclopentadienyl group may be one which has four hydrogen atoms or may be one in which some of the hydrogen atoms have been replaced by substituents as stated above. An example of the substituents is a hydrocarbon group having generally 1-20, preferably 1-15 carbon atoms. Specific examples thereof include methyl, ethyl, propyl, butyl, hexyl, octyl, phenyl, naphthyl, butenyl, butadienyl, and triphenylcarbyl.

Those hydrocarbon groups each may be bonded as a monovalent group to the cyclopentadienyl group, or two such substituents may be bonded at the ends thereof to each other to form a fused ring. Typical examples of the cyclopentadienyl group having such a fused ring include compounds such as indene, fluorene, and azulene and derivatives thereof. More preferred of these are indene, azulene, and derivatives thereof. Most preferred of these is azulene.

Examples of the substituents other than the hydrocarbon groups include hydrocarbon groups containing one or more atoms of silicon, oxygen, nitrogen, phosphorus, boron, sulfur, etc. Typical examples thereof include methoxy, ethoxy, phenoxy, furyl, trimethylsilyl, diethylamino, diphenylamino, pyrazolyl, indolyl, carbazolyl, dimethylphosphino, diphenylphosphino, diphenylboron, dimethoxyboron, and thienyl.

Other examples of the substituents include halogen atoms or halogen-containing hydrocarbon groups. Typical examples thereof include chlorine, bromine, iodine, fluorine, trichloromethyl, trifluoromethyl, fluorophenyl, and pentafluorophenyl.

Incidentally, a feature of the transition metal compound to be used in the invention may reside in that at least one of $A^1$ and $A^2$ has a fused ring which is bonded to adjacent substituents on the conjugated five-membered ring ligand and has 7-10 ring-forming atoms including the two atoms of the five-membered ring. Namely, either of $A^1$ and $A^2$ may at least form a fused ring having 7-10 ring-forming atoms including the two adjacent carbon atoms of the conjugated five-membered ring. In the fused ring, the carbon atoms other than the two atoms of the conjugated five-membered ring may be saturated or unsaturated.

Examples of such ligands constituting $A^1$ and $A^2$ include hydroazulenyl, methylhydroazulenyl, ethylhydroazulenyl, dimethylhydroazulenyl, methylethylhydroazulenyl, methylisopropylhydroazulenyl, methylphenylisopropylhydroazulenyl, hydrogenated forms of various azulenyl groups, bicyclo[6.3.0]undecanyl, methylbicyclo[6.3.0]undecanyl, ethylbicyclo[6.3.0]undecanyl, phenylbicyclo[6.3.0]undecanyl, methylphenylbicyclo[6.3.0]undecanyl, ethylphenylbicyclo[6.3.0]undecanyl, methyldiphenylbicyclo[6.3.0]undecanyl, methylbicyclo[6.3.0]undecadienyl, methylphenylbicyclo[6.3.0]undecadienyl, ethylphenylbicyclo[6.3.0]undecadienyl, methylisopropylbicyclo[6.3.0]undecadienyl, bicyclo[7.3.0]dodecanyl and derivatives thereof, bicyclo[7.3.0]dodecadienyl and derivatives thereof, bicyclo[8.3.0]tridecanyl and derivatives thereof, and bicyclo[8.3.0]tridecadienyl and derivatives thereof.

Examples of substituents for those groups include the hydrocarbon groups enumerated above, hydrocarbon groups containing one or more atoms of silicon, oxygen, nitrogen, phosphorus, boron, sulfur, etc., halogen atoms, or halogen-containing hydrocarbon groups.

Q represents a bonding group which bridges the two conjugated five-membered ring ligands in any position. Namely, Q is a divalent bonding group and bridges $A^1$ and $A^2$.

The kind of Q is not particularly limited. Examples thereof include (a) divalent hydrocarbon groups or halogenated hydrocarbon groups having generally 1-20, preferably 1-12 carbon atoms, such as unsaturated hydrocarbon groups, e.g., alkylene groups, cycloalkylene groups, and arylenes, haloalkylene groups, and halocycloalkylene groups, (b) silylene or oligosilylene groups, (c) silylene or oligosilylene groups having as a substituent a hydrocarbon or halogenated hydrocarbon group having generally 1-20, preferably 1-12 carbon atoms, (d) germylene, and (e) germylene groups having as a substituent a hydrocarbon or halogenated hydrocarbon group having generally 1-20 carbon atoms.

Preferred of these are the alkylene groups, cycloalkylene groups, arylene groups, and silylene or germylene groups having the hydrocarbon group as a substituent.

M represents an atom of a transition metal selected from Groups 4 to 6 of the periodic table (short form). M preferably is a Group 4 transition metal which is titanium, zirconium, or hafnium, and more preferably is zirconium or hafnium. Especially preferably, M is hafnium.

X and Y each independently represent a hydrogen atom, halogen atom, hydrocarbon group, amino group, halogenated hydrocarbon group, oxygen-containing hydrocarbon group, nitrogen-containing hydrocarbon group, phosphorus-containing hydrocarbon group, or silicon-containing hydrocarbon group bonded to the M.

Those hydrocarbon groups each have generally 1-20, preferably 1-12 carbon atoms. Preferred of those are a hydrogen atom, chlorine atom, methyl, isobutyl, phenyl, dimethylamino, and diethylamino.

Especially preferred examples of the transition metal compound in the invention are the following compounds because the block copolymer in the invention is characterized by being excellent in rigidity and heat resistance. Although the following compounds are indicated only by chemical names, each chemical name means both of the compounds respectively having stereostructural asymmetry and stereostructural symmetry according to the invention.

Examples thereof include (1) dichloro[1,1'-dimethylsilylenebis{2-methyl-4-(2-naphthyl)-4H-azulenyl}]zirconium, (2) dichloro[1,1'-dimethylsilylenebis{2-methyl-4-(4-t-butylphenyl)-4H-azulenyl}]hafnium, (3) dichloro[1,1'-dimethylsilylenebis{2-methyl-4-(2-fluoro-4-biphenylyl)-4H-azulenyl}]hafnium, (4) dichloro[1,1'-dimethylsilylenebis{2-methyl-4-(4-t-butylphenyl)-4H-5,6,7,8-tetrahydroazulenyl}]hafnium, (5) dichloro[1,1'-dimethylsilylenebis{2-ethyl-4-(2-fluoro-4-biphenyl)-4H-azulenyl}]hafnium, (6) dichloro[1,1'-dimethylsilylenebis{2-ethyl-4-(2-fluoro-4-biphenyl)-4H-5,6,7,8-tetrahydroazulenyl}]hafnium, (7) dichloro[1,1'-dimethylsilylenebis{2-ethyl-4-(3-chloro-4-t-butylphenyl)-4H-azulenyl}]hafnium, (8) dichloro[1,1'-dimethylsilylenebis{2-ethyl-4-(3-chloro-4-trimethylsilylphenyl)-4H-azulenyl}]hafnium, (9) dichloro[1,1'-dimethylsilylenebis{2-ethyl-4-(4-trimethylsilyl-3-methylphenyl)-4H-azulenyl}]hafnium, (10) dichloro[1,1-dimethylsilylenebis{2-ethyl-4-(4-trimethylsilyl-3,5-dichlorophenyl)-4H-azulenyl}]hafnium, (11) dichloro[1,1'-silafluorenylbis{2-ethyl-4-(4-trimethylsilyl-3,5-dichlorophenyl)-4H-azulenyl}]hafnium, and (12) dichloro[1,1'-silafluorenylbis{2-ethyl-4-(4-trimethylsilyl-3,5-dimethylphenyl)-4H-azulenyl}]hafnium.

Examples thereof further include the compounds enumerated above in which one or both of the dichlorides constituting the X and Y parts have been replaced by a hydrogen atom, fluorine atom, bromine atom, iodine atom, methyl, ethyl, isobutyl, phenyl, fluorophenyl, benzyl, methoxy, dimethylamino, diethylamino, or the like. Examples thereof furthermore include the compounds enumerated above in which the zirconium or hafnium as the central atom has been replaced by titanium, tantalum, niobium, vanadium, tungsten, molybdenum, or the like.

Preferred of those are the compounds of the Group-4 transition metals which are zirconium, titanium, and hafnium. Especially preferred of these is hafnium.

A combination of two or more such ingredient [A] compounds may be used. It is also possible to newly add ingredient [A] at the time of completion of first-stage polymerization or before the initiation of second-stage polymerization.

ii). [B] Promoter (Activator Ingredient)

As ingredient [B] in the invention, use is made of an activator comprising one or more members selected from (B-1) organic aluminumoxy compounds, (B-2) compounds capable of reacting with the transition metal compound to form a cation, and (B-3) ion-exchangeable layered compounds (including silicates).

Examples of the organic aluminumoxy compounds (B-1) in the invention include compounds represented by the following general formulae.

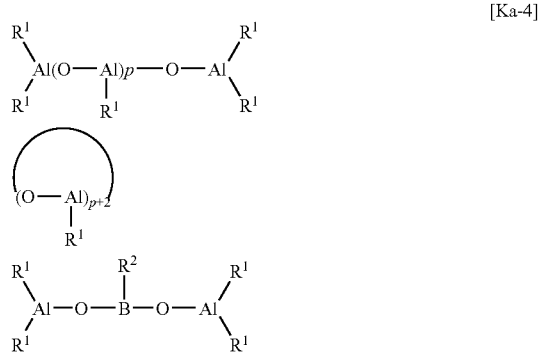

[Ka-4]

In the general formulae, $R^1$ represents a hydrogen atom or a hydrocarbon group, and preferably represents a hydrocarbon group having 1-10-carbon atoms, especially preferably 1-6-carbon atoms. The $R^1$s may be the same or different. Symbol p represents an integer of 0-40, preferably 2-30.

The compounds represented by the first and second formulae among those general formulae are compounds also called aluminoxanes. Preferred of these is methylaluminoxane or methylisobutylaluminoxane. A combination of two or more aluminoxanes selected from either of the groups or from both groups may be used. Those aluminoxanes can be produced under known various conditions.

The compounds represented by the third general formula can be obtained by reacting one trialkylaluminum or two or more trialkylaluminums with an alkylboric acid represented by the general formula $R^2B(OH)_2$ in a ratio of from 10:1 to 1:1 (by mole).

In the general formulae, $R^1$ and $R^2$ represent a hydrocarbon group having 1-10 carbon atoms, preferably 1-6 carbon atoms.

The compounds (B-2), which are capable of reacting with the transition metal compound to form a cation, for use in the invention may be ionic compounds or Lewis acids capable of reacting with ingredient [A] to convert the ingredient [A] into a cation. Examples of the ionic compounds include complexes of a cation, such as a carbonium cation or ammonium cation, with an organoboron compound such as triphenylboron, tris(3,5-difluorophenyl)boron, or tris(pentafluorophenyl)boron.

Examples of the Lewis acids include various organoboron compounds, e.g., tris (pentafluorophenyl)boron. Examples thereof further include metal halide compounds such as aluminum chloride and magnesium chloride.

Incidentally, some of those Lewis acids may be regarded as ionic compounds capable of reacting with ingredient [A] to convert the ingredient [A] into a cation.

It is most preferred that a product of reaction between ingredients [A] and (B-1) or a product of reaction between ingredients [A] and (B-2) should be used as a catalyst deposited on a finely particulate support such as silica.

In the invention, the ion-exchangeable layered compounds (including silicates) (B-3) are compounds which have a crystal structure made up of sheets which each are constituted by ionic bonding or the like and which have been stacked up in parallel by a weak bonding force. The ions contained in the crystal structure are exchangeable. Examples of the ion-exchangeable layered compounds include ionic crystalline compounds having a crystal structure of the hexagonal closest packing type, antimony type, $CdCl_2$ type, $CdI_2$ type, or the like.

Specific examples of the ion-exchangeable layered compounds having such a crystal structure include crystalline acid salts of polyvalent metals, such as $\alpha\text{-}Zr(HAsO_4)_2.H_2O$, $\alpha\text{-}Zr(HPO_4)_2$, $\alpha\text{-}Zr(KPO_4)_2.3H_2O$, $\alpha\text{-}Ti(HPO_4)_2$, $\alpha\text{-}Ti(HAsO_4)_2.H_2O$, $\alpha\text{-}Sn(HPO_4)_2.H_2O$, $\gamma\text{-}Zr(HPO_4)_2$, $\gamma\text{-}Ti(HPO_4)_2$, and $\gamma\text{-}Ti(NH_4PO_4)_2.H_2O$.

Examples of inorganic silicates include clays, clay minerals, zeolites, and diatomaceous earth. These may be synthetic ones or minerals occurring naturally. Examples of the clays and clay minerals include allophane-group minerals such as allophane, kaolin-group minerals such as dickite, nacrite, kaolinite, and anauxite, halloysite-group minerals such as metahalloysite and halloysite, serpentine-group minerals such as chrysotile, lizardite, and antigorite, smectite-group minerals such as montmorillonite, zaukonite, viderite, nontronite, saponite, and hectorite, vermiculite-group minerals such as vermiculite, mica-group minerals such as illite, sericite, and glauconite, and other minerals such as attapulgite, sepiolite, pigolskite, bentonite, Kibushi clay, Gairome clay, hisingerite, pyrophyllite, and chlorite. These minerals may form a mixed layer.

Examples of the artificial synthetic ones include synthetic micas, synthetic hectorite, synthetic saponite, and synthetic taeniolite.

Preferred of those examples are kaolin-group minerals such as dickite, nacrite, kaolinite, and anauxite, halloysite-group minerals such as metahalloysite and halloysite, serpentine-group minerals such as chrysotile, lizardite, and antigorite, smectite-group minerals such as montmorillonite, zaukonite, viderite, nontronite, saponite, and hectorite, vermiculite-group minerals such as vermiculite, mica-group minerals such as illite, sericite, and glauconite, synthetic micas, synthetic hectorite, synthetic saponite, and synthetic taeniolite. Especially preferred are smectite-group minerals such as montmorillonite, zaukonite, viderite, nontronite, saponite, and hectorite, vermiculite-group minerals such as vermiculite, synthetic micas, synthetic hectorite, synthetic saponite, and synthetic taeniolite.

Those ion-exchangeable layered compounds may be used as they are. It is, however, preferred to subject the layered compounds to a treatment with an acid such as hydrochloric acid, nitric acid, or sulfuric acid and/or a treatment with a salt such as LiCl, NaCl, KCl, $CaCl_2$, $MgCl_2$, $MgSO_4$, $ZnSO_4$, Ti(SO$_4$)$_2$, Zr(SO$_4$)$_2$, or Al$_2$(SO$_4$)$_3$. Furthermore, a shape-regulating processing such as pulverization or granulation may be conducted. For obtaining a block copolymer having excellent particle properties, it is preferred to granulate the layered compounds. The ingredient described above is used usually after having been dehydrated/dried.

iii). [C] Organoaluminum Compound

Examples of the organoaluminum compound which may be used as ingredient (C) in the invention include compounds represented by the formula

(wherein R is a hydrocarbon group having 1-20 carbon atoms; X is hydrogen, a halogen, alkoxy group, or aryloxy group; and m is a number satisfying 0<m<3). Specific examples thereof include trialkylaluminums such as trimethylaluminum, triethylaluminum, tripropylaluminum, and triisobutylaluminum or halogen- or alkoxy-containing alkylaluminums such as diethylaluminum monochloride and diethylaluminum ethoxide. Also usable besides these are aluminoxanes such as methylaluminoxane.

Especially preferred of these are trialkylaluminums. A combination of two or more such ingredient [C] compounds may be used. It is also possible to newly add ingredient [C] at the time of completion of first-stage polymerization or before the initiation of second-stage polymerization.

iv). Contacting and Support

Ingredient [A], ingredient [B], and ingredient [C] are brought into contact with one another to obtain a catalyst. Methods for the contacting are not particularly limited. Besides being conducted during catalyst preparation, the contacting may be performed at the time of olefin prepolymerization or olefin polymerization. During the contacting of the catalyst ingredients or after the contacting, a polymer such as polyethylene or polypropylene or a solid inorganic oxide such as silica or alumina may be caused to coexist or be contacted therewith.

The contacting may be performed in an inert gas such as nitrogen or in an inert hydrocarbon solvent such as pentane, hexane, heptane, toluene, or xylene. The contacting is preferably conducted at a temperature in the range of from −20° C. to the boiling point of the solvent, especially from room temperature to the boiling point of the solvent.

v). Amounts of Catalyst Ingredients to be Used

The amounts of the catalyst ingredients to be used are, for example, as follows. The amount of ingredient [A] is 0.0001-10 mmol, preferably 0.001-5 mmol, and that of ingredient [C] is 0.001-10.000 mmol, preferably 0.01-100 mmol, per g of ingredient (B-3). The atomic ratio of the transition metal in ingredient [A] to the aluminum in ingredient [C] may be 1: (0.01-1,000,000), and is preferably 0.1-100,000. The catalyst thus obtained may be used as it is without being washed, or may be used after having been washed.

According to need, the catalyst may be used newly in combination with ingredient [C]. The amount of ingredient [C] to be used in this case may be selected so that the atomic ratio of the aluminum in ingredient [C] to the transition metal in ingredient [A] becomes 1:(0-10,000).

vi). Prepolymerization

Before being used for polymerization, the catalyst may be used to preliminarily polymerize an olefin, such as ethylene, propylene, 1-butene, 1-hexene, 1-octene, 4-methyl-1-pentene, 3-methyl-1-butene, a vinylcycloalkane, or styrene, and then washed according to need. This preliminary polymerization may be conducted in an inert gas such as nitrogen or in an inert hydrocarbon solvent such as pentane, hexane, heptane, toluene, or xylene.

(2) Modes of Production Process

Although the block copolymer of the invention comprises at least three ingredients, it can be produced by a process comprising melt kneading or a multistage polymerization method comprising three or more stages.

From the standpoint of improving the impact resistance of the block copolymer, it is preferred to produce the composition by the multistage polymerization comprising three or more stages.

The proportions of the ingredients can be regulated by regulating polymerization conditions in the multistage polymerization or selecting blending ingredients.

(2-1) Melt Kneading (Blending) Method

In the case of producing the composition composed of, for example, three ingredients by melt kneading, use can be made, for example, of: a method in which ingredients (a), (b-1), and (b-2) themselves are separately produced by polymerization, mixed together in a given proportion, and then melt-kneaded together to produce the composition; a method in which a block copolymer obtained by producing ingredient (a) and ingredient (b-1) by multistage polymerization is mixed in a given proportion with a block copolymer obtained by producing ingredient (a) and ingredient (b-2) by multistage polymerization and the resultant mixture is melt-kneaded to produce the composition; or a method in which ingredient (a) is mixed in a given proportion with a random block copolymer obtained by producing ingredient (b-1) and ingredient (b-2) by multistage polymerization and the resultant mixture is melt-kneaded.

In the case of production by melt kneading, the technique of melt kneading with a single- or twin-screw extruder or a Brabender type batch mixer may be employed.

In the case where ingredients (a), (b-1), and (b-2) themselves are separately produced by polymerization, each ingredient can be produced by any desired polymerization process such as, e.g., the slurry process, bulk process, gas-phase process, or solution process. However, for producing ingredient (a), it is most preferred to use the bulk process or gas-phase process. For producing ingredients (b-1) and (b-2), it is most preferred to use the solution process from the stand point of ease of recovery of the polymer finally obtained, because these ingredients are so-called elastomers. With respect to polymerization mode, either of the batch polymerization method and the continuous polymerization method can be employed.

A polymerization temperature in a temperature range in ordinary use can be employed without arousing any particular problem. Specifically, a temperature in the range of 0° C. to 200° C., preferably 40° C. to 100° C., can be used. A polymerization pressure in a pressure range in ordinary use can be employed without arousing any particular problem, although it varies depending on processes for selection. Specifically, a pressure in the range of from higher than 0 to 200 MPa, preferably 0.1-50 MPa, can be used. In this polymerization, an inert gas such as nitrogen may be caused to coexist.

In the case where a block copolymer obtained by producing ingredient (a) and ingredient (b-1) by multistage polymerization is mixed in a given proportion with a block copolymer obtained by producing ingredient (a) and ingredient (b-2) by multistage polymerization and the resultant mixture is melt-kneaded, each block copolymer can be produced by conducting multistage polymerization in which ingredient (a) is produced in the first stage and ingredient (b-1) or ingredient (b-2) is produced in the second stage. The polymerization process to be used in this case can be any desired one such as, e.g., the slurry process, bulk process, gas-phase process, or solution process. It is also possible to employ different polymerization processes in the first stage and second stage, respectively. Most preferred of such methods is one in which the production of ingredient (a) in the first stage is conducted by the bulk process or gas-phase process and the production of ingredient (b-1) or ingredient (b-2) in the second stage is conducted by the gas-phase process. With respect to polymerization mode, either of the batch polymerization method and the continuous polymerization method can be employed.

A polymerization temperature in a temperature range in ordinary use can be employed without arousing any particular problem. Specifically, a temperature in the range of 0° C. to 200° C., preferably 40° C. to 100° C., can be used. A polymerization pressure in a pressure range in ordinary use can be employed without arousing any particular problem, although it varies depending on processes for selection. Specifically, a pressure in the range of from higher than 0 to 200 MPa, preferably 0.1-50 MPa, can be used. In this polymerization, an inert gas such as nitrogen may be caused to coexist.

(2-2) Three-Stage Polymerization (Multistage Polymerization) Method i). Three-Stage Polymerization For producing the composition of the invention, a three-stage polymerization method can be employed in which ingredient (a) is produced in the first stage, ingredient (b-1) is produced in the second stage, and ingredient (b-2) is produced in the third stage. As the polymerization process in this case, the slurry process, bulk process, gas-phase process, solution process, or the like can be used at will. Most preferred of these is a method in which the production of ingredient (a) in the first stage is conducted by the bulk process or gas-phase process and the production of ingredient (b-1) in the second stage and of ingredient (b-2) in the third stage is conducted by the gas-phase process. With respect to polymerization mode, either of the batch polymerization method and the continuous polymerization method can be employed.

A polymerization temperature in a temperature range in ordinary use can be employed without arousing any particular problem. Specifically, a temperature in the range of 0° C. to 200° C., preferably 40° C. to 100° C., can be used. A polymerization pressure in a pressure range in ordinary use can be employed without arousing any particular problem, although it varies depending on processes for selection. Specifically, a pressure in the range of from higher than 0 to 200 MPa, preferably 0.1-50 MPa, can be used. In this polymerization, an inert gas such as nitrogen may be caused to coexist. The proportions of the ingredients (a), (b-1), and (b-2) can be regulated by controlling the proportions in which the ingredients are produced.

ii). Determination of Property Values (Indexes)

In the case of production by multistage polymerization comprising three or more stages, indexes concerning the ethylene content and molecular weight of each ingredient can be determined in the following manner. A sample obtained after completion of each stage of polymerization is analyzed by the successive TREF-GPC-IR method, whereby the ethylene content and molecular weight of the polymer produced by polymerization in that stage can be determined. In this case, the indexes for each of the copolymers produced in the third and succeeding stages are determined by calculation using the indexes for the copolymers produced in the preceding stages.

For example, in the case of three-stage polymerization in which ingredients (a), (b-1), and (b-2) are produced in this order, copolymer analysis is conducted in the following manner. Each of samples respectively obtained at the time of completion of the polymerization for producing ingredient (a), at the time when the polymerization has been conducted to the production of ingredient (b-1), and at the time when the polymerization has been conducted to the production of ingredient (b-2) is examined for polymerization amount, ethylene content, and molecular weight to thereby determine the indexes for each ingredient.

With respect to ingredient (b-2) in particular, calculation is possible according to the following formulae (F4) and (F5).

$$Mw(b) = W(b\text{-}1) \times Mw(b\text{-}1) + W(b\text{-}2) \times Mw(b\text{-}2) \tag{F4}$$

$$[E](b) = W(b\text{-}1) \times [E](b\text{-}1) + W(b\text{-}2) \times [E](b\text{-}2) \tag{F5}$$

In the formulae, Mw(b) and [E](b) respectively are the weight-average molecular weight and ethylene content of the copolymer ingredient (mixture of ingredient (b-1) and ingredient (b-2)) which are determined from the analysis conducted at the time of completion of third-stage polymerization. Mw(b-1) and E(b-1) respectively are the weight-average molecular weight and ethylene content of ingredient (b-1) which are determined from the analysis conducted at the time of completion of second-stage polymerization.

The polymerization amount can be determined by separating the reactor from the polymerization system at the time of completion of each stage and measuring the amount of the polymer present in the reactor by directly weighing the reactor containing the polymer. Alternatively, use may be made of a method in which polymerization for producing ingredient (a) only and two-stage polymerization for producing ingredient (a) and ingredient (b-1) are separately conducted beforehand under the same conditions as in the multistage polymerization and the polymerization amount is determined therefrom. In the case of polymerization conducted in four or more stages, the indexes can be calculated using formulae obtained by extending those formulae.

In the case of conducting analysis through sampling, use may be made of a method in which the polymerization amount, average molecular weight, and average ethylene content for each stage are determined without conducting fractionation by TREF and the indexes for each ingredient are determined also using those calculation formulae. In this case, the following formulae (F6) to (F9) are used.

$$Mw[(a)+(b\text{-}1)] = [W(a) \times Mw(a) + W(b\text{-}1) \times Mw(b\text{-}1)]/[W(a)+W(b\text{-}1)] \tag{F6}$$

$$Mw(\text{total}) = [W(a)+W(b\text{-}1)] \times [Mw(a)+Mw(b\text{-}1)] + [W(b\text{-}2) \times Mw(b\text{-}2)] \tag{F7}$$

$$[E][(a)+(b\text{-}1)] = [W(a) \times [E](a) + W(b\text{-}1) \times [E](b\text{-}1)]/[W(a)+W(b\text{-}1)] \tag{F8}$$

$$[E](\text{total}) = [W(a)+W(b\text{-}1)] \times [E][(a)+(b\text{-}1)] + [W(b\text{-}2) \times [E](b\text{-}2)] \tag{F9}$$

In the formulae, Mw(a), Mw(b-1), and Mw(b-2) are the weight-average molecular weights of ingredient (a), ingredient (b-1), and ingredient (b-2), respectively. Mw[(a)+(b-1)] is the weight-average molecular weight of a sample in which the polymerization has been conducted to the production of ingredient (b-1), and Mw(total) is the weight-average molecular weight of a sample in which the polymerization has been conducted to the production of ingredient (b-2); these can be evaluated through GPC analysis of samples drawn out. Likewise, E(a), E(b-1), and E(b-2) are the ethylene contents of ingredient (a), ingredient (b-1), and ingredient (b-2), respectively. E[(a)+(b-1)] is the ethylene content of a sample in which the polymerization has been conducted to the production of ingredient (b-1), and E(total) is the ethylene content of a sample in which the polymerization has been conducted to the production of ingredient (b-2); these can be evaluated through IR analysis of samples drawn out. W(a), W(b-1), and W(b-2) are the proportions by weight of ingredient (a), ingredient (b-1), and ingredient (b-2), respectively. In the case of polymerization conducted in four or more stages, the indexes can be calculated using formulae obtained by extending those formulae.

3. Elastomer Ingredient (Ingredient (II))

The ethylene/α-olefin elastomer and the styrene elastomer are used as ingredient (II) in the invention for the purposes of improving impact resistance and imparting satisfactory moldability, physical properties, and shrink properties.

In the ethylene/α-olefin elastomer, examples of the comonomer to be copolymerized with ethylene include α-olefins having 4-20 carbon atoms, such as 1-octene and 1-butene. This ingredient need not be one elastomer, and may be a mixture of two or more ethylene/α-olefin elastomers or styrene elastomers. The ethylene/α-olefin elastomer has an α-olefin content of 10-60 wt %, preferably 20-50 wt %, and a density of 0.85-0.90 g/cm$^3$, preferably 0.86-0.88 g/cm$^3$.

The styrene elastomer is a block or random copolymer of styrene and one or more of ethylene, propylene, 1-butene, butadiene, isoprene, and the like or a product of hydrogenation of the copolymer. The styrene elastomer has a combined-styrene content of 5-45 wt %, preferably 10-40 wt %, and a density of 0.88-0.95 g/cm$^3$, preferably 0.89-0.92 g/cm$^3$.

Ingredient (II) has an MFR of 0.1-20 g/10 min, preferably 0.5-10 g/10 min. In case where the MFR thereof is lower than g/10 min, the composition is poor in moldability and coatability. In case where the MFR thereof exceeds 20 g/10 min, the composition has poor impact resistance.

The ethylene/α-olefin elastomer can be produced by conducting polymerization using a known titanium-based catalyst or metallocene catalyst. In the case of the styrene elastomer, it can be obtained by the ordinary anionic polymerization method and the technique of hydrogenating the polymer.

The amount of the ethylene/α-olefin elastomer and styrene elastomer to be incorporated is 0-70 parts by weight. For use in applications where impact resistance is important, the amount thereof is preferably 5-50 parts by weight, especially preferably 10-40 parts by weight. Amounts of the ethylene/α-olefin copolymer elastomer exceeding 70 parts by weight are undesirable because this propylene resin composition is considerably reduced in rigidity and heat resistance.

4. Inorganic Filler (Ingredient (III))

Examples of the inorganic filler which may be used as ingredient (III) in the invention include talc, wollastonite, calcium carbonate, barium sulfate, mica, glass fibers, carbon fibers, clay, and organic clay. Preferred are talc, mica, glass fibers, and carbon fibers. Talc is especially preferred. Talc is effective in improving rigidity and in imparting dimensional stability to molded articles and regulating this property.

The particle diameter (including fiber diameter) of the inorganic filler varies depending on the inorganic compound used. In the case of fibers, the fiber diameter thereof may be about 3-40 µm. In the case of a particulate material, the particle diameter thereof may be about 1.5-150 µm. In the case of talc, which is a preferred inorganic filler, it has an average particle diameter of 1.5-40 µm, especially preferably 2-15 µm. Average particle diameters of the talc smaller than 1.5 are undesirable because this talc aggregates, resulting in an impaired appearance. Average particle diameters thereof exceeding 40 µm are undesirable because this talc reduces impact strength.

In the case of a particulate material, e.g., talc, it is generally produced by first pulverizing, e.g., a raw talc ore with an impact pulverizer or Micron Mill type pulverizer or by a method in which the resultant powder is further pulverized with a jet mill or the like and then classified with a cyclone, Micron Separator, or the like. Talc whose surface has been treated with any of various metal soaps may be used. Furthermore, so-called compressed talc having an apparent specific volume of 2.50 mL/g or lower may be used.

The average particle diameters of the particulate materials shown above are values determined with a laser diffraction/scattering type particle size distribution analyzer. The examination apparatus preferably is, for example, Type LA-920, manufactured by Horiba Ltd., because it has excellent examination accuracy. On the other hand, the fiber diameter of carbon fibers or glass fibers is generally determined by cutting the fibers in the direction perpendicular to the fiber direction, examining the resultant sections with a microscope to measure the diameters thereof, and averaging the diameters of 100 or more fibers.

The amount of the inorganic filler to be incorporated into the composition may be 5-70 parts by weight, and is preferably 7-50 parts by weight, especially preferably 10-40 parts by weight. Amounts of the inorganic filler smaller than 5 parts by weight are undesirable because the effect of improving rigidity is insufficient. Amounts thereof exceeding 70 parts by weight are undesirable because the propylene resin composition has reduced impact resistance.

5. Propylene Block Copolymer (Ingredient (IV)) Polymerized by Ziegler Type Catalyst (1) Basic Definition The propylene block copolymer to be used as ingredient (IV) in the invention preferably is a block copolymer obtained by the two-stage polymerization of propylene and ethylene. Although this copolymer may be one produced by the slurry polymerization process, gas-phase polymerization process, or liquid-phase bulk polymerization process using a Ziegler type high-stereoregularity catalyst, it is preferred to produce the copolymer by the gas-phase polymerization process from the standpoints of coatability and cost. With respect to polymerization mode, either of batch polymerization and continuous polymerization may be employed. However, it is preferred to produce the copolymer by continuous polymerization.

In producing this propylene/ethylene block copolymer, use may be made of a method in which a crystalline propylene homopolymer part is first formed by the homopolymerization of propylene and an ethylene/propylene random copolymer part is then formed by the random copolymerization of propylene and ethylene. This block copolymer is preferred from the standpoint of quality.

(2) Production Process

The block copolymer can be produced specifically by the following production process. The homopolymerization of propylene is conducted by a method in which use is made of: a titanium trichloride catalyst comprising titanium trichloride and a halogenated organoaluminum; or a supported-magnesium catalyst comprising a solid catalyst ingredient containing magnesium chloride, a halogenated titanium, and an electron-donating compound as essential components, an organoaluminum, and an organosilicon compound. Alternatively, the homopolymerization of propylene is conducted using a catalyst comprising a combination of: an organosilicon-treated solid catalyst ingredient formed by contacting a solid catalyst ingredient with an organoaluminum and an organosilicon compound; and an organoaluminum compound ingredient. Subsequently, the random copolymerization of propylene and ethylene is conducted to thereby produce the target block copolymer. This propylene/ethylene block copolymer may be a copolymer comprising units of three or more monomers including one or more of other unsaturated compounds, e.g., α-olefins such as 1-butene, vinyl esters such as vinyl acetate, and unsaturated organic acids or derivatives thereof such as maleic anhydride, or a mixture of such copolymers, as long as this does not considerably impair the essence of the invention.

(3) Property Values

The MFR of the propylene block copolymer is 15-200 g/10 min, preferably 20-100 g/10 min, more preferably 25-70 g/10 min. MFRs thereof lower than 15 g/10 min are undesirable because this propylene block copolymer makes the propylene resin composition have a low MFR and give molded article having impaired appearance performance. MFRs thereof exceeding 200 g/10 min are undesirable because this results in impaired impact resistance and impaired elongation properties.

The propylene block copolymer has a crystalline polypropylene content of 65-95 wt %, preferably 70-90 wt %, more preferably 75-85 wt %. In the case where the propylene block copolymer is a propylene/ethylene block copolymer, the content of ethylene/propylene copolymer parts is 5-35 wt %, preferably 10-30 wt %, more preferably 15-25 wt % (provided that the sum of the crystalline polypropylene parts and the ethylene/propylene copolymer parts is 100 wt %).

Furthermore, the ethylene/propylene copolymer parts have an ethylene content of 30-55 wt %, preferably 35-45 wt %.

The amount of the propylene block copolymer to be incorporated is 30-80 wt %, preferably 35-70 wt %, more preferably 40-60 wt %, based on the whole composition. Amounts thereof smaller than 30 wt % are undesirable because this composition gives molded articles having impaired appearance performance. Amounts thereof exceeding 80 wt % are undesirable because this results in an impaired balance between impact resistance and other properties.

6. Others (1) Use of Additives

Additives may be incorporated into the resin composition of the invention in order to enhance performances of the composition of the invention or impart other performances thereto, as long as the incorporation thereof does not impair the functions of the invention.

As such additive ingredients, various additives in general use as compounding agents for polyolefin resins can be added, such as a nucleating agent, phenolic antioxidant, phosphorus compound antioxidant, sulfur compound antioxidant, neutralizing agent, light stabilizer, ultraviolet absorber, lubricant, antistatic agent, metal deactivator, peroxide, antibacterial, fungicide, fluorescent brightener, and colorant.

The amount of such additives to be added is generally 0.0001-3 parts by weight, preferably 0.001-1 part by weight, per 100 parts by weight of the composition.

Preferred examples of rubbers usable for improving impact resistance include an ethylene/α-olefin elastomer and a styrene elastomer. In the ethylene/α-olefin elastomer, examples of the comonomer to be copolymerized with ethylene include α-olefins having 4-20 carbon atoms, such as 1-octene and 1-butene. This ingredient need not be one elastomer, and may be a mixture of two or more ethylene/α-olefin elastomers or styrene elastomers. The ethylene/α-olefin elastomer has an α-olefin content of 10-60 wt %, preferably 20-50 wt %, and a density of 0.85-0.90 g/cm$^3$, preferably 0.86-0.88 g/cm$^3$.

On the other hand, the styrene elastomer is a block or random copolymer of styrene and one or more of ethylene, propylene, 1-butene, butadiene, isoprene, and the like or a product of hydrogenation of the copolymer. The styrene elastomer has a combined-styrene content of 5-45 wt %, preferably 10-40 wt %, and a density of 0.88-0.95 g/cm$^3$, preferably 0.89-0.92 g/cm$^3$.

This ingredient has an MFR of 0.1-20 g/10 min, preferably 0.5-10 g/10 min. In case where the MFR thereof is lower than 0.1 g/10 min, the composition is poor in moldability and coatability. In case where the MFR thereof exceeds 20 g/10 min, the composition has poor impact resistance. The values of MFR herein means ones measured under the conditions of 230° C., 2.160-kg load, and a die shape having a diameter of 2.095 mm and a length of 8.00 mm.

The ethylene/α-olefin elastomer can be produced by conducting polymerization using a known titanium-based catalyst or metallocene catalyst. In the case of the styrene elastomer, it can be obtained by the ordinary anionic polymerization method and the technique of hydrogenating the polymer.

(2) Use of Other Resins

Other resins may be incorporated into the resin composition of the invention in order to enhance performances of the composition of the invention or impart other performances thereto, as long as the incorporation thereof does not impair the functions of the invention.

As such additive ingredients, resins in general use as compounding materials for polyolefin resins can be added, such as LLDPE, LDPE, HDPE, modified polypropylenes, polycarbonates, polyamides, and modified PPEs.

The amount of such resins to be incorporated is generally 0.5-10 parts by weight, preferably 1-5 parts by weight, per 100 parts by weight of the composition.

(3) Production of Resin Composition

In the invention, the ingredients described above, i.e., the propylene polymer composition, elastomer, and inorganic filler, and other ingredients such as optional ingredients which are used according to need are mixed together in the proportion shown above, and this mixture is kneaded/granulated with an ordinary kneading machine such as a single-screw extruder, twin-screw extruder, Banbury mixer, roll mixer, Brabender Plastograph, or kneader. Thus, the propylene resin composition of the invention is obtained.

In this case, it is preferred to select a method of kneading/granulation which can satisfactorily disperse each ingredient. Usually, the kneading/granulation is conducted with a twin-screw extruder. In this kneading/granulation, a mixture of those ingredients may be simultaneously kneaded or may be successively kneaded. For the purpose of improving performances, the ingredients may be kneaded in portions. For example, a method may be employed in which part or all of the propylene block polymer composition is kneaded first and the remaining ingredients are kneaded/granulated thereafter.

(4) Uses

The resin composition of the invention has been sufficiently improved in rigidity, heat resistance, and impact resistance while retaining a satisfactory balance among these. This composition is hence useful as various industrial materials including interior trim materials for vehicles such as motor vehicles and wrapping/packaging materials for electrical products, etc.

Since the composition especially has improved low-temperature (about −30° C.) impact resistance, it is effectively usable also as packaging materials for frozen-food storage or the like and containers therefor or as industrial materials for low-temperature use.

EXAMPLES

In order to explain the invention in more detail, preferred Examples and Comparative Examples corresponding to these are shown below. Comparisons between the Examples and the Comparative Examples will demonstrate the rationality and significance of the requirements in the constitution of the invention and clearly shows the superiority of the invention to prior-art techniques.

The methods of examining properties, methods of producing compositions, methods of evaluating the compositions, and methods of producing raw-material ingredients used in the following Examples and Comparative Examples are as follows.

1) TREF

Details of the method of examination by TREF are as described hereinabove.

2) GPC

Apparatus: GPC (ALC/GPC 150C) manufactured by Waters Inc.

Detector: MIRAN 1A IR detector (detection wavelength, 3.42 μm), manufactured by FOXBORO Corp.

Column: AD806M/S (three), manufactured by Showa Denko K.K.

Mobile phase solvent: o-dichlorobenzene (ODCB)
Examination temperature: 140° C.
Flow rate: 1.0 mL/min
Injection amount: 0.2 mL Sample preparation: A sample is prepared by preparing a 1 mg/mL solution using ODCB (containing 0.5 mg/mL BHT); the dissolution requires about 1-hour heating at 140° C. The conversion of a retention volume obtained by the GPC examination to a molecular weight is made with a calibration curve drawn beforehand using standard polystyrenes. The standard polystyrenes to be used are ones of the following trade names, which each are manufactured by Tosoh Corp.; F380, F288, F128, F80, F40, F20, F10, F4, F1, A5000, A2500, and A1000.

Those standard polystyrenes each are dissolved in ODCB (containing 0.5 mg/mL BHT) so as to result in 0.5 mg/mL. Each resultant solution is injected in an amount of 0.2 mL to draw a calibration curve. For the calibration curve is used a third-order equation obtained through approximation by the least square method. For conversion to a molecular weight, a general calibration curve is used with reference to Sadao Mori, *Saizu Haijo Kuromatografi* (Kyoritsu Shuppan Co., Ltd.). The following numerical values are used in the viscosity formula ($[\eta]=K \times M^{\alpha}$) to be used in the conversion.

[In Drawing of Calibration Curve Using Standard Polystyrene]

$K=1.38 \times 10^{-4}$ $\alpha=0.70$

[In Examination of Propylene/Ethylene Block Copolymer Sample]

$K=1.03 \times 10^{-4}$ $\alpha=0.78$

3) DSC

A DSC manufactured by Seiko Inc. was used to make a measurement in the following manner.

A 5.0-mg sample is weighed out and held at 200° C. for 5 minutes. Thereafter, the sample is cooled to 40° C. at a rate of 10° C./min to cause crystallization and eliminate the thermal history thereof. This sample is then melted by heating at a rate of 10° C./min to obtain a melting curve. The peak temperature in the curve is taken as the melting point. In the case of a resin composition in which two or more melting points are observed, that observed at the highest temperature is taken as the melting point of this resin composition.

4) DMA

A sample of a rectangular shape having a width of 10 mm, length of 18 mm, and thickness of 2 mm cut out of an injection-molded sheet having a thickness of 2 mm was used. (With respect to the injection molding, see Example A1. The same applies to the following test items.)

The apparatus used was ARES, manufactured by Rheometric Scientific, and the frequency is 1 Hz. The examination temperature was elevated stepwise from −80° C. The examination was continued until the sample melted to become unable to be examined. The strain was in the range of 0.1-0.5%.

5) MFR

A measurement was made under the following conditions in accordance with JIS K7210 method A/conditions M.
Test temperature: 230° C.
Nominal load: 2.16 kg
Die shape
Diameter: 2.095 mm
Length: 8.000 mm 6) Determination of Ethylene Content The average ethylene content of a copolymer was determined with an infrared spectrophotometer. Examination conditions are shown below.
Apparatus: Shimadzu FTIR-8300
Resolution: 4.0 $cm^{-1}$
Examination range: 4,000-400 $cm^{-1}$ Sample preparation: A polymer in a powder or pellet form is formed into a film having a thickness of 500 μm with a heating press (the polymer is pressed at 100 MPa after 2-minute preheating at a temperature of 190° C.)

Data processing: i) Wave numbers of 760 and 700 $cm^{-1}$ are taken as base points, and the area of the absorbance peak in this range is calculated. (This corresponds to ethylene content.) ii) The value of peak area/sample thickness is calculated. iii) A calibration curve is drawn beforehand using samples whose ethylene contents have been determined by NMR spectroscopy, and the ethylene content is determined using the relationship [(ethylene content) (peak area)/(sample thickness)].

7) Flexural Properties

Flexural modulus: The flexural modulus of a composition obtained was evaluated under the following conditions.
Number of Standard: in accordance with JIS K-7171 (ISO178)
Testing machine: precision universal testing machine Autograph AG-20kNG (manufactured by Shimadzu Corp.)
Direction of test piece sampling: flow direction
Shape of test piece: thickness, 4 mm; width 10 mm; length, 80 mm
Method of test piece production: injection molding
Conditioning: standing for 24 hours or longer in thermostatic chamber kept at temperature of 23° C. and humidity of 50%
Test laboratory: thermostatic chamber kept at temperature of 23° C. and humidity of 50%
Number of test pieces: 5
Distance between supports: 32.0 mm
Testing speed: 1.0 mm/min 8) Impact Strength Impact resistance was evaluated through a Charpy impact test.
Number of Standard: in accordance with JIS K-7111 (ISO 179/1eA)
Testing machine: fully automatic Charpy impact tester (equipped with thermostatic chamber) manufactured by Toyo Seiki Ltd.
Shape of test piece: single-notched test piece (thickness, 4 mm; width, 10 mm; length, 80 mm)
Notch shape: type A notch (notch radius, 0.25 mm)
Impact speed: 2.9 m/s
Nominal pendulum energy: 4 J Method of test piece production: to form a notch in injection-molded test piece (in accordance with ISO 2818)

Conditioning: standing for 24 hours or longer in thermostatic chamber kept at a temperature of 23° C. and humidity of 50%

Testing laboratory: thermostatic chamber kept at temperature of 23° C. and humidity of 50%

Number of test pieces: n=5

Testing temperatures: 23° C., 0° C., and −30° C. (in the case of 0° C. and −30° C., test was conducted after 40-minute or longer conditioning in the thermostatic chamber kept at (testing temperature)±1° C.

Evaluation item: absorption energy

9) Heat Resistance

Heat resistance was evaluated in terms of heat distortion temperature (HDT). HDT was measured in flatwise direction using an injection-molded piece having a thickness of 4 mm under the conditions of 0.45 MPa in accordance with JIS K7191-1. In conditioning before examination, however, the test piece obtained by injection molding was annealed at 100° C. for 30 minutes and then cooled to room temperature.

Production Example 1

Example of Three-Stage Polymerization

1) Preparation of Ingredient [A]

Synthesis of r-Dichloro[1,1'-dimethylsilylenebis{2-ethyl-4-(2-fluoro-4-biphenylyl)-4H-azulenyl}]hafnium (Synthesis of Racemic/Meso Mixture)

In a mixed solvent composed of diethyl ether (50 mL) and hexane (50 mL) was dissolved 2-fluoro-4-bromobiphenyl (6.35 g; 25.3 mmol). Thereto was dropwise added a pentane solution of t-butyllithium (33 mL; 50.6 mmol; 1.54 N) at −78° C. This mixture was stirred at −10° C. for 2 hours. 2-Ethylazulene (3.55 g; 22.8 mmol) was added to the resultant solution and this mixture was stirred at room temperature for 2 hours. Hexane (30 mL×2) was added thereto, and the supernatant was removed by decantation. To the yellow precipitate obtained were added hexane (30 mL) and tetrahydrofuran (40 mL) at 0° C. Thereto were added N-methylimidazole (50 µL) and dimethyldichlorosilane (1.4 mL; 11.4 mmol). The resultant mixture was heated to room temperature and stirred at room temperature for 1 hour. Thereafter, diluted hydrochloric acid was added and the resultant mixture was separated into phases. The organic phase was dried with magnesium sulfate and the solvent was distilled off under reduced pressure. As a result, crude dimethylsilylenebis{2-ethyl-4-(2-fluoro-4-biphenyl)-1,4-dihydroazulene} (8.3 g) was obtained.

Subsequently, the crude compound obtained above was dissolved in diethyl ether (30 mL), and a hexane solution of n-butyllithium (14.9 mL; 22.8 mmol; 1.53 N) was added dropwise thereto at −70° C. This mixture was gradually heated and stirred at room temperature overnight. Furthermore, toluene (200 mL) was added thereto and this mixture was cooled to −70° C. Hafnium tetrachloride (3.6 g; 11.4 mmol) was added thereto, and this mixture was gradually heated and stirred at room temperature for 4 hours. Under reduced pressure, most of the solvent was distilled off the slurry solution obtained. Diethyl ether (50 mL) was added thereto and the slurry obtained was filtered. The solid matter was washed with diethyl ether (5 mL×2), ethanol (15 mL×2), and hexane (10 mL×2). As a result, a racemic/meso mixture of dichloro[1,1'-dimethylsilylenebis{2-ethyl-4-(2-fluoro-4-biphenyl)-4H-azulenyl}]hafnium (4.53 g; yield, 42%) was obtained.

Purification of Racemate: The racemic/meso mixture obtained above (4.5 g) was suspended in dichloromethane (35 mL) and the suspension was irradiated with light using a high-pressure mercury lamp (100 W) for 1 hour. The solvent was distilled off the resultant solution under reduced pressure. Toluene (25 mL) and dichloromethane (11 mL) were added to the solid obtained and this mixture was heated to 60° C., upon which the mixture became a homogeneous solution. The dichloromethane was distilled off the solution under reduced pressure, resulting in crystal precipitation. The crystals were taken out by filtration, washed with hexane (5 mL×2), and dried under reduced pressure. As a result, a racemate (1.79; 37%) was obtained.

1H-NMR (300 MHz, CDCl$_3$); δ 1.02 (s, 6H, SiMe$_2$), 1.08 (t, J=8 Hz, 6H, CH$_3$CH$_2$), 2.54 (sept, J=8 Hz, 2H, CH$_3$CH$_2$), 2.70 (sept, J=8 Hz, 2H, CH$_3$CH$_2$), 5.07 (brs, 2H, 4-H), 5.85-6.10 (m, 8H), 6.83 (d, J=12 Hz, 2H), 7.30-7.6 (m, 16H, arom).

2) Preparation of Ingredient [B]

[Chemical Treatment] Into a 5-L separable flask equipped with a stirrer and a refluxing device was introduced 500 g of ion-exchanged water. Thereto was further added 249 g (5.93 mol) of lithium hydroxide monohydrate. The resultant mixture was stirred. Separately from it, 581 g (5.93 mol) of sulfuric acid was diluted with 500 g of ion-exchanged water. This diluted acid was added dropwise to that aqueous lithium hydroxide solution with a dropping funnel.

In this operation, part of the sulfuric acid is consumed by a neutralization reaction to yield lithium sulfate salt in the system and the system comes into a sulfuric-acid-excess state and thereby becomes an acid solution. Thereto was further added 350 g of a commercial granulated montmorillonite (manufactured by Mizusawa Industrial Chemicals, Ltd.; Benclay SL; average particle diameter, 28.0 µm). The resultant mixture was stirred. Thereafter, the mixture was heated to 108° C. over 30 minutes, held at this temperature for 150 minutes, and then cooled to 50° C. over 1 hour. This slurry was subjected to vacuum filtration with an apparatus comprising a Nutsche funnel, a suction bottle, and an aspirator connected thereto. The resultant cake was recovered and slurried again with 5.0 L of pure water, and the slurry was filtered. This operation was further repeated four times.

Each filtration operation ended in several minutes at the most. The final washings (filtrate) had a pH of 5. The cake recovered was dried overnight at 110° C. in a nitrogen atmosphere. As a result, 275 g of a chemically treated material was obtained. It was subjected to compositional analysis by fluorescent X-ray spectroscopy. As a result, the molar ratios of constituent elements to the silicon as a main component were found to be as follows: Al/Si=0.21, Mg/Si=0.046, Fe/Si=0.022.

[Organoaluminum Treatment of the Chemically Treated Montmorillonite] 10.0 Grams of the chemically treated montmorillonite obtained above was weighed out and placed in a flask having a capacity of 1 L. Thereto were added 64.6 mL of heptane and 35.4 mL of a heptane solution of triisobutylaluminum (25 mmol). This mixture was stirred at room temperature for 1 hour. Thereafter, the montmorillonite was washed with heptane, and the slurry amount was finally adjusted to 100 mL.

3) Prepolymerization of Propylene

To the heptane slurry of triisobutylaluminum-treated montmorillonite prepared above was added 2.13 mL (1,504 µmol) of a heptane solution of triisobutylaluminum. This mixture was stirred at room temperature for 10 minutes. On the other hand, toluene (60 mL) was added in another flask (capacity, 200 mL) to the (r)-dichloro[1,1'-dimethylsilylenebis{2-ethyl-4-(2-fluoro-4-biphenylyl)-4H-azulenyl}]

hafnium (299 μmol) synthesized above to prepare a slurry. This slurry was added to that 1-L flask, and the contents were stirred at room temperature for 60 minutes.

The toluene slurry of the complex was analyzed to determine the amounts of the dissolved component and undissolved component of the complex. As a result, the amounts of the dissolved component and undissolved component of the complex were found to be 60 μmol and 239 μmol, respectively. The dissolved-component amount relative to the montmorillonite amount was 6 μmol/g-support.

Subsequently, 340 mL of heptane was further added to the montmorillonite heptane slurry. The resultant mixture was introduced into a stirring type autoclave having a capacity of 1 L and stirred for 60 minutes. After the temperature in the autoclave became stable at 40° C., propylene was fed at a constant rate of 238.1 mmol/hr (10 g/hr) over 120 minutes. After completion of the propylene feeding, the contents were heated to 50° C. and kept as they were for 2 hours. Thereafter, the residual gas was purged and the resultant prepolymerization catalyst slurry was recovered from the autoclave. The total time period required for the prepolymerization was 4 hours. The prepolymerization catalyst slurry recovered was allowed to stand still and the supernatant was discharged. To the residual solid was added 8.5 mL (6.0 mmol) of a heptane solution of triisobutylaluminum at room temperature. This mixture was stirred at room temperature for 10 minutes and then dried under reduced pressure to recover 31.8 g of a solid catalyst. The prepolymerization ratio (value obtained by dividing prepolymer amount by solid catalyst amount) was 2.09.

4) Polymerization

Polymerization comprising the following first step to third step was conducted to produce a propylene/ethylene block copolymer.

(First-Step Polymerization) The atmosphere in an autoclave having a capacity of 3 L and equipped with a stirrer was sufficiently replaced by propylene. Thereafter, 2.76 mL (2.02 mmol) of a heptane solution of triisobutylaluminum was added. Thereinto was introduced 700 mL of hydrogen, followed by 1,500 mL of liquid propylene. The contents were heated to 65° C. The prepolymerization catalyst obtained under 3) above was slurried with heptane, and this slurry was forced into the autoclave in an amount of 40 mg in terms of solid catalyst amount (net solid catalyst amount excluding the prepolymer) to initiate polymerization. The temperature in the vessel was kept at 65° C. At 1 hour after the catalyst introduction, the residual monomer was purged and the atmosphere in the vessel was completely replaced by purified nitrogen. The polymer yielded was sampled, and this sample was weighed after 30-minute drying in a 90° C. nitrogen stream. As a result, the amount of the polymer drawn out was found to be 15 g.

(Second-Step Polymerization) Simultaneously with the above operation, a gaseous mixture composed of 72.49 vol % propylene, 27.49 vol % ethylene, and 0.02 vol % hydrogen was prepared in a propylene/ethylene gas mixture vessel (autoclave having a capacity of 14 L and equipped with a stirrer) at 80° C. and a gauge pressure of 2.7 MPa. Stirring in the polymerization vessel was resumed, and the inside of the polymerization vessel was regulated so as to have a gas composition composed of 43 vol % propylene and 57 vol % ethylene and have an internal pressure of 1.5 MPa in terms of gauge pressure. Thereafter, the gaseous mixture prepared above was fed at such a rate that the polymerization vessel had a pressure of 1.5 MPa in terms of gauge pressure. Thus, the gas-phase copolymerization of propylene and ethylene was conducted at 65° C. for 5 minutes. Thereafter, the residual monomer was purged. The polymer yielded was sampled, and this sample was weighed after 30-minute drying in a 90° C. nitrogen stream. As a result, the amount of the polymer drawn out was found to be 15 g.

(Third-Step Polymerization) Simultaneously with the above operation, a gaseous mixture composed of 44.99 vol % propylene, 54.98 vol % ethylene, and 0.03 vol % hydrogen was prepared in a propylene/ethylene gas mixture vessel (autoclave having a capacity of 14 L and equipped with a stirrer) at 80° C. and a gauge pressure of 2.7 MPa. Stirring in the polymerization vessel was resumed, and the inside of the polymerization vessel was regulated so as to have a gas composition composed of 24 vol % propylene and 76 vol % ethylene and have an internal pressure of 2.0 MPa in terms of gauge pressure. Thereafter, the gaseous mixture prepared above was fed at such a rate that the polymerization vessel had a pressure of 2.0 MPa in terms of gauge pressure. Thus, the gas-phase copolymerization of propylene and ethylene was conducted at 80° C. for 20 minutes. After completion of the polymerization, the polymer was recovered and dried in a 90° C. nitrogen stream for 30 minutes.

The polymerization conditions are summarized in Table 1. A small amount of a sample was drawn out in each stage of the polymerization and examined for ethylene content and molecular weight. The results thereof are shown in Table 1. In Table 2 are shown the results of the analysis of each sample by the TREF-GPC-IR method.

Production Example 2

Example of Three-Stage Polymerization

A block copolymer was produced in the same manner as in Production Example 1, except that the polymerization conditions were changed as shown in Table 1. A small amount of a sample was drawn out in each stage of the polymerization and examined for ethylene content and molecular weight. The results thereof are also shown in Table 1. In Table 2 are shown the results of the analysis of each sample by the TREF-GPC-IR method.

Production Example 3

Example for Producing Composition of Ingredient (a) and Ingredient (b-1) for Kneading A block copolymer was produced by two-stage polymerization. The copolymer was produced in the same manner as in Production Example 1, except that the gas composition in the polymerization vessel in the second step was changed to one composed of 82 vol % propylene and 18 vol % ethylene and the other polymerization conditions were as shown in Table 3.

In Production Example 3, the polymer obtained by the second-stage polymerization had too low an ethylene content and fractionation thereof by TREF was insufficient. Because of this, the amount and ethylene content of the copolymer ingredient were determined by calculation from the results concerning the ethylene content and molecular weight of a sample drawn out during the polymerization. As a result, the Mw of the propylene polymer part and the Mw of the copolymer part were found to be $1.20 \times 10^5$ and $3.88 \times 10^5$, respectively. Furthermore, the content of the copolymer ingredient was found to be 20.0 wt % and the ethylene content of the copolymer part was found to be 5.0 wt %.

Each of the Production Examples shown above was repeatedly conducted several times according to need to produce a necessary amount of the polymer, which was used in Examples given later.

Production Example 4

Example for Producing Composition of Ingredient (a) and Ingredient (b-1) for Kneading A block copolymer was produced by two-stage polymerization. The copolymer was produced in the same manner as in Production Example 1, except that the gas composition in the polymerization vessel in the second step was changed to one composed of 54 vol % propylene and 46 vol % ethylene and the other polymerization conditions were as shown in Table 2.

A sample obtained in these Production Examples was analyzed by the TREF-GPC-IR method. The results thereof are also shown in Table 3. Each of the Production Examples shown above was repeatedly conducted several times according to need to produce a necessary amount of the polymer, which was used in Examples given later.

Also in each of the following Production Examples, a sample obtained was analyzed by the TREF-GPC-IR method in the same manner. The results thereof are also shown in Table 3. Each Production Example was repeatedly conducted several times according to need to produce a necessary amount of the polymer, which was used in Examples given later.

Production Example 5

Example for Producing Composition of Ingredient (a) and Ingredient (b-1) for Kneading A block copolymer was produced by two-stage polymerization. The copolymer was produced in the same manner as in Production Example 1, except that the gas composition in the polymerization vessel in the second step was changed to one composed of 42 vol % propylene and 58 vol % ethylene and the other polymerization conditions were as shown in Table 3.

Production Example 6

Example for Producing Composition of Ingredient (a) and Ingredient (b-1) for Kneading A block copolymer was produced by two-stage polymerization. The copolymer was produced in the same manner as in Production Example 1, except that the gas composition in the polymerization vessel in the second step was changed to one composed of 28 vol % propylene and 72 vol % ethylene and the other polymerization conditions were as shown in Table 3.

Production Example 7

Example for Producing Composition of Ingredient (a) and Ingredient (b-1) for Kneading A block copolymer was produced by two-stage polymerization. The copolymer was produced in the same manner as in Production Example 1, except that the gas composition in the polymerization vessel in the second step was changed to one composed of 42 vol % propylene and 58 vol % ethylene and the other polymerization conditions were as shown in Table 3.

Production Example 8

Example for Producing Composition of Ingredient (a) and Ingredient (b-2) for Kneading A block copolymer was produced by two-stage polymerization. The copolymer was produced in the same manner as in Production Example 1, except that the gas composition in the polymerization vessel in the second step was changed to one composed of 28 vol % propylene and 72 vol % ethylene and the other polymerization conditions were as shown in Table 3.

Production Example 9

Example for Producing Composition of Ingredient (a) and Ingredient (b-2) for Kneading A block copolymer was produced by two-stage polymerization. The copolymer was produced in the same manner as in Production Example 1, except that the gas composition in the polymerization vessel in the second step was changed to one composed of 24 vol % propylene and 76 vol % ethylene and the other polymerization conditions were as shown in Table 3.

Production Example 10

Example for Producing Composition of Ingredient (a) and Ingredient (b-2) for Kneading A block copolymer was produced by two-stage polymerization. The copolymer was produced in the same manner as in Production Example 1, except that the gas composition in the polymerization vessel in the second step was changed to one composed of 21 vol % propylene and 79 vol % ethylene and the other polymerization conditions were as shown in Table 3.

Production Example 11

Example for Producing Composition of Ingredient (a) and Ingredient (b-2) for Kneading A block copolymer was produced by two-stage polymerization. The copolymer was produced in the same manner as in Production Example 1, except that the gas composition in the polymerization vessel in the second step was changed to one composed of 16 vol % propylene and 84 vol % ethylene and the other polymerization conditions were as shown in Table 3.

Production Example 12

Example for Producing Composition of Ingredient (a) and Ingredient (b-2) for Kneading A block copolymer was produced by two-stage polymerization. The copolymer was produced in the same manner as in Production Example 1, except that the gas composition in the polymerization vessel in the second step was changed to one composed of 24 vol % propylene and 76 vol % ethylene and the other polymerization conditions were as shown in Table 3.

Production Example 13

Example for Producing Composition of Ingredient (a) and Ingredient (b-2) for Kneading A block copolymer was produced by two-stage polymerization. The copolymer was produced in the same manner as in Production Example 1, except that the gas composition in the polymerization vessel in the second step was changed to one composed of 24 vol % propylene and 76 vol % ethylene and the other polymerization conditions were as shown in Table 3.

Production Example 14

Example of Production with Ziegler Catalyst (Preparation of Solid Catalyst Ingredient)
Into a flask the atmosphere in which had been sufficiently replaced by nitrogen was introduced 2,000 mL of dehydrated and deoxygenated n-heptane. Subsequently, 2.6 mol of $MgCl_2$ and 5.2 mol of $Ti(O-n-C_4H_9)_4$ were introduced thereinto and reacted at 95° C. for 2 hours. After completion of the reaction, the temperature was lowered to 40° C. Subsequently, 320 mL of a methylhydropolysiloxane (one having a viscosity of 20 cSt) was introduced and reacted for 3 hours. The solid ingredient yielded was washed with n-heptane. Subsequently, 4,000 mL of n-heptane purified in the same manner as for that used above was introduced into a flask the atmosphere in which had been sufficiently replaced by nitrogen, and the solid ingredient synthesized above was introduced in an amount of 1.46 mol in terms of magnesium atom amount. Subsequently, 25 mL of n-heptane was mixed with 2.62 mol of $SiCl_4$, and this mixture was introduced into the flask over 30 minutes at 30° C. The resultant mixture was reacted at 70° C. for 3 hours. After completion of the reaction, the solid matter was washed with n-heptane. Subsequently, 25 mL of n-heptane was mixed with 0.15 mol of phthaloyl chloride, and this mixture was introduced into the flask over 30 minutes at 70° C. The resultant mixture was reacted at 90° C. for 1 hour. After completion of the reaction, the solid matter was washed with n-heptane. Subsequently, 11.4 mol of $TiCl_4$ was introduced and reacted at 110° C. for 3 hours. After completion of the reaction, the solid matter was washed with n-heptane to obtain a solid ingredient (A1). This solid ingredient had a titanium content of 2.0 wt %.

Subsequently, 200 mL of n-heptane purified in the same manner as for that used above was introduced into a flask the atmosphere in which had been sufficiently replaced by nitrogen. Four grams of the solid ingredient (A1) synthesized above and 0.035 mol of $SiCl_4$ were introduced into the flask and reacted at 90° C. for 2 hours. After completion of the reaction, 0.006 mol of $(CH_2=CH)Si(CH_3)_3$, 0.003 mol of $(t-C_4H_9)(CH_3)Si(OCH_3)_2$, and 0.016 mol of $Al(C_2H_5)_3$ were successively introduced and kept in contact with the product of that reaction at 30° C. for 2 hours. After completion of the contacting, the solid matter was sufficiently washed with n-heptane to obtain a solid catalyst ingredient (A) consisting mainly of magnesium chloride. The ingredient (A) was sampled and this sample was analyzed. As a result, this ingredient (A) was found to have a titanium content of 1.8 wt %. (The catalyst preparation described above was conducted by the method described in the Example 1 of JP-A-11-80235.)

(Preparation of Prepolymerization Catalyst)
Purified n-heptane was added to the solid catalyst ingredient (A) to prepare a slurry in which the concentration of the solid catalyst ingredient (A) was 20 g/L. After the slurry was cooled to 15° C., $Al(C_2H_5)_3$ diluted with n-heptane was added thereto in an amount of 0.5 g in terms of $Al(C_2H_5)_3$ amount and 9 g of propylene was slowly fed. After completion of the propylene feeding, the reaction was continued for further 10 minutes. Subsequently, the gas-phase part was sufficiently replaced by nitrogen and the reaction product was sufficiently washed with purified n-heptane. Thereafter, vacuum drying was conducted to obtain a prepolymerization catalyst (B). This prepolymerization catalyst (B) contained 2.0 g of polypropylene per g of the solid catalyst ingredient (A).

(Production of Propylene/Ethylene Block Copolymer)
First-Step Polymerization: The atmosphere in an autoclave having a capacity of 3 L and equipped with a stirrer and a thermostat was sufficiently replaced by propylene. Thereafter, 4.82 mol of triethylaluminum diluted with n-heptane was introduced. Into the autoclave was further introduced 5,500 mL of hydrogen, followed by 750 g of liquid propylene. The contents were heated to 70° C. and kept at this temperature. The prepolymerization catalyst (B) was slurried with n-heptane, and this slurry was forced into the autoclave in an amount of 7 mg in terms of catalyst amount (excluding the weight of the prepolymer) to initiate polymerization. The temperature in the vessel was kept at 70° C. to continue the polymerization for 40 minutes. Thereafter, the residual monomer was purged to ordinary pressure, and the atmosphere in the vessel was completely replaced by purified nitrogen. The polymer yielded was sampled, and this sample was analyzed after sufficient drying.

Second-Step Polymerization: Separately from the above operation, a gaseous mixture to be used in the second step was prepared using an autoclave having a capacity of 20 L and equipped with a stirrer and a thermostat. The preparation temperature was 80° C. and the gaseous mixture had a composition composed of 29.70 vol % ethylene, 69.07 vol % propylene, and 1.23 vol % hydrogen. After the polymer had been sampled in the first step, the gaseous mixture was fed to the 3-L autoclave to initiate second-step polymerization. This polymerization was continued for 17 minutes at a temperature of 80° C. and a pressure of 2.0 MPaG. Thereafter, 10 mL of ethanol was introduced to terminate the polymerization. The polymer recovered was sufficiently dried in an oven.

The samples obtained were analyzed by the TREF-GPC-IR method. The results thereof are shown in Table 3.

Example A1

The following antioxidant and neutralizing agent were added to the polymer powder obtained in Production Example 1, and the ingredients were sufficiently stirred and mixed.

(Additive Incorporation) Antioxidant: tetrakis{methylene-3-(3',5'-di-t-butyl-4'-hydroxyphenyl)propionate}methane 500 ppm and tris(2,4-di-t-butylphenyl) phosphite 500 ppm; Neutralizing agent: calcium stearate 500 ppm.

The mixture was granulated and molded under the following conditions and the test pieces obtained were evaluated for properties. The granulation conditions and molding conditions are shown below.

(Granulation) Extruder: twin-screw extruder KZW-15-45MG, manufactured by Technovel Corp.
Screws: diameter, 15 mm; L/D=45
Extruder temperatures: (from under hopper) 40, 80, 160, 200, 200, 200 (die, ° C.)

Screw rotation speed: 400 rpm

Extrusion rate: regulated to about 1.5 kg/hr with screw feeder

Die: strand die having two holes having opening diameter of 3 mm;

(Molding) The raw-material pellets obtained were injection-molded under the following conditions to obtain flat test pieces for property evaluation. Number of Standard: JIS K-7152 (ISO 294-1)

Molding machine referred: injection molding machine EC20P, manufactured by Toshiba Machine Co., Ltd.

Molding machine temperatures: (from under hopper) 80, 210, 210, 200, 200° C. Mold temperature: 40° C.

Injection rate: 52 mm/s (screw speed)

Hold pressure: 30 MPa

Hold time: 8 sec

Mold shape: flat plate (thickness, 4 mm; width, 10 mm; length, 80 mm); two molded objects in one shot The indexes of the resin composition, data of analysis by TREF-GPC-IR, and data on properties are shown in Table 4. Those for each of the following Examples also are shown in Table 4.

Example A2

The same procedure as in Example 1 was conducted, except that the powder obtained in Production Example 2 was used.

Example A3

The same procedure as in Example 1 was conducted, except that a mixture prepared by mixing the block copolymer powder of Production Example 5 with the block copolymer powder of Production Example 9 in a weight ratio of 20:80 was used as block copolymers. In this case, the copolymer ingredient of Production Example 5 and the copolymer ingredient of Production Example 9 can be regarded as the compatibilizing agent ingredient (b-1) and the copolymer ingredient (b-2), respectively.

Example A4

The same procedure as in Example 1 was conducted, except that a mixture prepared by mixing the block copolymer powder of Production Example 4 with the block copolymer powder of Production Example 9 in a weight ratio of 20:80 was used as block copolymers.

Example A5

The same procedure as in Example 1 was conducted, except that a mixture prepared by mixing the block copolymer powder of Production Example 5 with the block copolymer powder of Production Example 10 in a weight ratio of 20:80 was used as block copolymers.

Example A6

The same procedure as in Example 1 was conducted, except that a mixture prepared by mixing the block copolymer powder of Production Example 5 with the block copolymer powder of Production Example 9 in a weight ratio of 35:65 was used as block copolymers.

Example A7

The same procedure as in Example 1 was conducted, except that a mixture prepared by mixing the block copolymer powder of Production Example 5 with the block copolymer powder of Production Example 9 in a weight ratio of 5:95 was used as block copolymers.

Example A8

The same procedure as in Example 1 was conducted, except that a mixture prepared by mixing the block copolymer powder of Production Example 7 with the block copolymer powder of Production Example 9 in a weight ratio of 20:80 was used as block copolymers.

Comparative Example A1

The same procedure as in Example 1 was conducted, except that the block copolymer powder of Production Example 9 was used alone as a block copolymer. The indexes of the resin composition, data of analysis by TREF-GPC-IR, and data on properties are shown in Table 5. Those for each of the following Comparative Examples also are shown in Table 5.

Comparative Example A2

The same procedure as in Example 1 was conducted, except that the block copolymer powder of Production Example 13 was used alone as a block copolymer.

Comparative Example A3

The same procedure as in Example 1 was conducted, except that a mixture prepared by mixing the block copolymer powder of Production Example 5 with the block copolymer powder of Production Example 9 in a weight ratio of 50:50 was used as block copolymers.

Comparative Example A4

The same procedure as in Example 1 was conducted, except that a mixture prepared by mixing the block copolymer powder of Production Example 3 with the block copolymer powder of Production Example 9 in a weight ratio of 20:80 was used as block copolymers.

Comparative Example A5

The same procedure as in Example 1 was conducted, except that a mixture prepared by mixing the block copolymer powder of Production Example 6 with the block copolymer powder of Production Example 9 in a weight ratio of 20:80 was used as block copolymers.

Comparative Example A6

The same procedure as in Example 1 was conducted, except that a mixture prepared by mixing the block copolymer powder of Production Example 5 with the block copolymer powder of Production Example 8 in a weight ratio of 20:80 was used as block copolymers.

Comparative Example A7

The same procedure as in Example 1 was conducted, except that a mixture prepared by mixing the block copolymer powder of Production Example 5 with the block copolymer powder of Production Example 11 in a weight ratio of 20:80 was used as block copolymers.

Comparative Example A8

The same procedure as in Example 1 was conducted, except that a mixture prepared by mixing the block copolymer powder of Production Example 7 with the block copolymer powder of Production Example 12 in a weight ratio of 20:80 was used as block copolymers.

Comparative Example A9

The same procedure as in Example 1 was conducted, except that the block copolymer powder of Production Example 14 was used alone as a block copolymer.

Example A9

The same procedure as in Example 1 was conducted, except that a mixture prepared by mixing the block copolymer powder of Production Example 5 with the block copolymer powder of Production Example 9 in a weight ratio of 20:80 was used as block copolymers, and that 20 parts by weight of EOR-1 (ethylene-octene rubber; ENGAGE 8100, manufactured by DuPont Dow; MFR=2.0 g/10 min) was added to 100 parts by weight of the mixture. The results of property evaluation are shown in Table 6.

Example A10

The same procedure as in Example 1 was conducted, except that a mixture prepared by mixing the block copolymer powder of Production Example 5 with the block copolymer powder of Production Example 9 in a weight ratio of 20:80 was used as block copolymers, and that 20 parts by weight of SEBS-1 (styrene-ethylene-butene-styrene block polymer rubber; Kraton G2657, manufactured by Shell; MFR=9.0 g/10 min) was added to 100 parts by weight of the mixture. The results of property evaluation are shown in Table 6.

Example A11

The same procedure as in Example 1 was conducted, except that a mixture prepared by mixing the block copolymer powder of Production Example 5 with the block copolymer powder of Production Example 9 in a weight ratio of 20:80 was used as block copolymers, and that 20 parts by weight of EBM-1 (ethylene-butene rubber; Tafiner A1050S, manufactured by Mitsui Chemicals, Inc.; MFR=2.4 g/10 min) was added to 100 parts by weight of the mixture. The results of property evaluation are shown in Table 6.

TABLE 1

|  |  |  |  | Production Example 1 | Production Example 2 |
|---|---|---|---|---|---|
| Polymerization conditions | First step | Catalyst amount (excluding prepolymer) | mg | 40 | 40 |
|  |  | Temperature | °C. | 65 | 65 |
|  |  | Time | min | 60 | 60 |
|  |  | Hydrogen feed amount | mL | 700 | 700 |
|  |  | Ethylene feed amount | g | 0 | 0 |
|  | Second step | Temperature | °C. | 65 | 70 |
|  |  | Pressure | MPaG | 1.5 | 1.5 |
|  |  | Time | min | 5 | 5 |
|  |  | Ethylene concentration in feed gas | vol % | 27.49 | 27.49 |
|  |  | Propylene concentration in feed gas | vol % | 72.49 | 72.49 |
|  |  | Hydrogen concentration in feed gas | vol % | 0.02 | 0.02 |
|  | Third step | Temperature | °C. | 80 | 80 |
|  |  | Pressure | MPaG | 2 | 2 |
|  |  | Time | min | 20 | 40 |
|  |  | Ethylene concentration in feed gas | vol % | 54.98 | 54.98 |
|  |  | Propylene concentration in feed gas | vol % | 44.99 | 44.99 |
|  |  | Hydrogen concentration in feed gas | vol % | 0.03 | 0.03 |
| Polymerization results | After first step | Ethylene content | wt % | 0 | 0 |
|  |  | Mw ($\times 10^{-5}$) | g/mol | 1.19 | 1.19 |
|  |  | Activity | kg/g-catalyst | 7.9 | 7.9 |
|  | After second step | Ethylene content | wt % | 0.97 | 1.62 |
|  |  | Mw ($\times 10^{-5}$) | g/mol | 1.32 | 1.40 |
|  |  | Yield | g | 332 | 344 |
|  |  | Activity | kg/g-catalyst | 8.3 | 8.6 |
|  | After third step | Ethylene content | wt % | 8.5 | 11.9 |
|  |  | Mw ($\times 10^{-5}$) | g/mol | 1.68 | 1.90 |
|  |  | Yield | g | 401 | 450 |
|  |  | Activity | kg/g-catalyst | 10.0 | 11.3 |

TABLE 2

|  |  |  | Production Example 1 | Production Example 2 |
|---|---|---|---|---|
| Results of analysis by TREF-GPC-IR after first step | Content of ingredient (a) | wt % | 100 | 100 |
|  | Mw of ingredient (a) ($\times 10^{-5}$) | g/mol | 1.19 | 1.19 |
| Results of analysis by TREF-GPC-IR after second step | Content of ingredient (a) | wt % | 95.2 | 91.9 |
|  | Content of ingredient (b-1) | wt % | 4.8 | 8.1 |
|  | Ethylene content in ingredient (b-1) | wt % | 20.0 | 20.0 |
|  | Mw of ingredient (b-1) ($\times 10^{-5}$) | g/mol | 3.80 | 3.80 |
| Results of analysis by | Content of ingredient (a) | wt % | 78.8 | 70.2 |
|  | Content of ingredient (b) | wt % | 21.2 | 29.8 |
| TREF-GPC-IR after third step | Ethylene content in ingredient (b) | wt % | 40.3 | 39.8 |
|  | Mw of ingredient (b) ($\times 10^{-5}$) | g/mol | 3.52 | 3.56 |
| Indexes of ingredients determined by calculation | Content of ingredient (b-1) | wt % | 4.0 | 6.2 |
|  | Content of ingredient (b-2) | wt % | 17.2 | 23.6 |
|  | Ethylene content in ingredient (b-2) | wt % | 45.0 | 45.0 |
|  | Mw of ingredient (b-2) ($\times 10^{-5}$) | g/mol | 3.45 | 3.50 |

TABLE 3

|  |  |  |  | Production Example 3 | Production Example 4 | Production Example 5 | Production Example 6 | Production Example 7 | Production Example 8 |
|---|---|---|---|---|---|---|---|---|---|
| Polymerization conditions | First step | Catalyst amount (excluding prepolymer) | mg | 40 | 40 | 40 | 40 | 40 | 40 |
|  |  | Temperature | ° C. | 65 | 65 | 65 | 65 | 65 | 65 |
|  |  | Time | min | 60 | 60 | 60 | 60 | 60 | 60 |
|  |  | Hydrogen Feed amount | mL | 700 | 700 | 700 | 700 | 700 | 700 |
|  |  | Ethylene Feed amount | g | 0 | 0 | 0 | 0 | 0 | 0 |
|  | Second step | Temperature | ° C. | 80 | 80 | 80 | 80 | 80 | 80 |
|  |  | Pressure | MPaG | 2 | 2 | 2 | 2 | 2 | 2 |
|  |  | Time | min | 15 | 20 | 20 | 25 | 30 | 30 |
|  |  | Ethylene concentration in feed gas | vol % | 7.00 | 20.00 | 27.99 | 44.99 | 27.99 | 44.99 |
|  |  | Propylene concentration in feed gas | vol % | 92.98 | 79.98 | 71.99 | 54.99 | 71.96 | 54.98 |
|  |  | Hydrogen concentration in feed gas | vol % | 0.02 | 0.02 | 0.02 | 0.02 | 0.05 | 0.03 |
| Polymerization results | After first step | Ethylene content | wt % | 0 | 0 | 0 | 0 | 0 | 0 |
|  |  | Mw ($\times 10^{-5}$) | g/mol | 1.20 | 1.18 | 1.21 | 1.18 | 1.19 | 1.20 |
|  |  | Activity | kg/g-catalyst | 7.9 | 7.9 | 7.8 | 8.0 | 7.9 | 7.9 |
|  | After second step | Ethylene content | wt % | 1.0 | 3.1 | 4.0 | 7.1 | 4.4 | 7.2 |
|  |  | Mw ($\times 10^{-5}$) | g/mol | 1.74 | 1.74 | 1.74 | 1.71 | 1.54 | 1.67 |
|  |  | Yield | g | 395 | 399 | 390 | 401 | 405 | 398 |
|  |  | Activity | kg/g-catalyst | 9.9 | 10.0 | 9.8 | 10.0 | 10.1 | 10.0 |
| Results of analysis | Analysis by TREF-GPC-IR method | Mw of PP part ($\times 10^{-5}$) | g/mol | — | 1.18 | 1.21 | 1.18 | 1.19 | 1.20 |
|  |  | Mw of copolymer ingredient ($\times 10^{-5}$) | g/mol | — | 3.85 | 3.86 | 3.80 | 2.79 | 3.48 |
|  |  | Content of copolymer ingredient (according to formula (II)) | wt % | — | 21.0 | 20.0 | 20.8 | 21.3 | 20.5 |
|  |  | Ethylene content in copolymer (according to formula (III)) | wt % | — | 15.0 | 20.0 | 35.1 | 19.8 | 35.0 |

TABLE 3-continued

|  |  |  |  | Production Example 9 | Production Example 10 | Production Example 11 | Production Example 12 | Production Example 13 | Production Example 14 |
|---|---|---|---|---|---|---|---|---|---|
| Polymerization conditions | First step | Catalyst amount (excluding prepolymer) | mg | 40 | 40 | 40 | 40 | 40 | 7 |
|  |  | Temperature | ° C. | 65 | 65 | 65 | 65 | 65 | 70 |
|  |  | Time | min | 60 | 60 | 60 | 60 | 60 | 40 |
|  |  | Hydrogen Feed amount | mL | 700 | 700 | 700 | 700 | 700 | 5500 |
|  |  | Ethylene Feed amount | g | 0 | 0 | 0 | 0 | 0 | 0 |
|  | Second step | Temperature | ° C. | 80 | 80 | 80 | 80 | 80 | 80 |
|  |  | Pressure | MPaG | 2 | 2 | 2 | 2 | 2 | 2 |
|  |  | Time | min | 30 | 30 | 40 | 40 | 50 | 17 |
|  |  | Ethylene concentration in feed gas | vol % | 54.98 | 59.98 | 69.98 | 54.95 | 54.98 | 29.70 |
|  |  | Propylene concentration in feed gas | vol % | 44.99 | 39.99 | 29.99 | 44.95 | 44.99 | 69.07 |
|  |  | Hydrogen concentration in feed gas | vol % | 0.03 | 0.03 | 0.03 | 0.10 | 0.03 | 1.23 |
| Polymerization results | After first step | Ethylene content | wt % | 0 | 0 | 0 | 0 | 0 | 0 |
|  |  | Mw (×10$^{-5}$) | g/mol | 1.19 | 1.19 | 1.21 | 1.18 | 1.19 | 1.60 |
|  |  | Activity | kg/g-catalyst | 7.9 | 7.9 | 7.8 | 7.9 | 7.9 | 34.1 |
|  | After second step | Ethylene content | wt % | 9.4 | 10.0 | 12.0 | 9.7 | 13.1 | 6.8 |
|  |  | Mw (×10$^{-5}$) | g/mol | 1.67 | 1.66 | 1.67 | 1.35 | 1.87 | 4.00 |
|  |  | Yield | g | 400 | 395 | 390 | 403 | 446 | 295 |
|  |  | Activity | kg/g-catalyst | 10.0 | 9.9 | 9.8 | 10.1 | 11.2 | 42.1 |
| Results of analysis | Analysis by TREF-GPC-IR method | Mw of PP part (×10$^{-5}$) | g/mol | 1.19 | 1.19 | 1.21 | 1.18 | 1.19 | 1.60 |
|  |  | Mw of copolymer ingredient (×10$^{-5}$) | g/mol | 3.48 | 3.55 | 3.51 | 1.99 | 3.51 | 4.00 |
|  |  | Content of copolymer ingredient (according to formula (II)) | wt % | 20.6 | 19.9 | 20.3 | 20.8 | 29.8 | 19.5 |
|  |  | Ethylene content in copolymer (according to formula (III)) | wt % | 44.9 | 50.0 | 60.2 | 45.0 | 45.1 | 35.5 |

TABLE 4

|  |  |  | Example A1 | Example A2 | Example A3 | Example A4 | Example A5 | Example A6 | Example A7 | Example A8 |
|---|---|---|---|---|---|---|---|---|---|---|
| Composition index | Resins blended |  | — | — | Production Example 5/ Production Example 9 | Production Example 4/ Production Example 9 | Production Example 5/ Production Example 10 | Production Example 5/ Production Example 9 | Production Example 5/ Production Example 9 | Production Example 7/ Production Example 9 |
|  | Blending proportion | wt % | — | — | 20/80 | 20/80 | 20/80 | 35/65 | 5/95 | 20/80 |
|  | Ethylene content in ingredient (b-1) | wt % | 20.0 | 20.0 | 20.0 | 15.0 | 20.0 | 20.0 | 20.0 | 19.8 |
|  | Ethylene content in ingredient (b-2) | wt % | 45.0 | 45.0 | 44.9 | 44.9 | 50.0 | 44.9 | 44.9 | 44.9 |
|  | Mw of ingredient (b-1) (×10$^{-5}$) | g/mol | 3.80 | 3.80 | 3.86 | 3.85 | 3.86 | 3.86 | 3.86 | 2.79 |
|  | Mw of ingredient (b-2) (×10$^{-5}$) | g/mol | 3.45 | 3.50 | 3.48 | 3.48 | 3.55 | 3.48 | 3.48 | 3.48 |

TABLE 4-continued

|  |  |  | Example A1 | Example A2 | Example A3 | Example A4 | Example A5 | Example A6 | Example A7 | Example A8 |
|---|---|---|---|---|---|---|---|---|---|---|
|  | (b-1):(b-2) weight ratio |  | 19:81 | 21:79 | 20:80 | 20:80 | 20:80 | 34:66 | 5:95 | 21:79 |
| Results of analysis of composition | Mw of PP part ($\times 10^{-5}$) | g/mol | 1.19 | 1.19 | 1.19 | 1.19 | 1.19 | 1.20 | 1.19 | 1.19 |
|  | Melting point, Tm | °C. | 158 | 158 | 158 | 158 | 158 | 158 | 158 | 158 |
|  | Mw of copolymer ingredient ($\times 10^{-5}$) | g/mol | 3.6 | 3.6 | 3.6 | 3.6 | 3.6 | 3.6 | 3.5 | 3.3 |
|  | Content of copolymer ingredient (according to formula (II)) | wt % | 21.2 | 29.8 | 20.5 | 20.7 | 19.9 | 20.4 | 20.6 | 20.7 |
|  | Ethylene content in copolymer (according to formula (III)) | wt % | 40.1 | 40.0 | 40.0 | 38.8 | 44.0 | 36.4 | 43.7 | 39.7 |
|  | Ethylene content in 100° C.-eluted part | wt % | 0.4 | 0.5 | 0.4 | 0.5 | 0.3 | 0.5 | 0.3 | 0.3 |
| Property | MFR | g/10 min. | 47 | 32 | 31 | 31 | 31 | 30 | 31 | 33 |
|  | tanδ peak temperature | °C. | −53 | −53 | −53 | −53 | −55 | −50 | −53 | −53 |
|  | Flexural modulus | MPa | 1140 | 860 | 1170 | 1170 | 1140 | 1180 | 1140 | 1160 |
|  | Charpy impact strength, 23° C. | kJ/m² | 10.1 | 15.0 | 9.2 | 9.0 | 8.7 | 9.5 | 7.9 | 7.7 |
|  | Charpy impact strength, 0° C. | kJ/m² | 8.0 | 12.0 | 7.1 | 7.4 | 7.3 | 6.8 | 6.6 | 6.5 |
|  | Charpy impact strength, −30° C. | kJ/m² | 7.0 | 9.0 | 6.8 | 6.6 | 7.0 | 6.6 | 6.3 | 6.0 |
|  | HDT | °C. | 107 | 100 | 107 | 107 | 107 | 107 | 107 | 107 |

TABLE 5

|  |  |  | Comparative Example A1 | Comparative Example A2 | Comparative Example A3 | Comparative Example A4 | Comparative Example A5 | Comparative Example A6 | Comparative Example A7 | Comparative Example A8 | Comparative Example A9 |
|---|---|---|---|---|---|---|---|---|---|---|---|
| Composition index | Resins blended |  | — | — | Production Example 5/ Production Example 9 | Production Example 3/ Production Example 9 | Production Example 6/ Production Example 9 | Production Example 5/ Production Example 8 | Production Example 5/ Production Example 11 | Production Example 7/ Production Example 12 | — |
|  | Blending proportion |  | — | — | 50/50 | 20/80 | 20/80 | 20/80 | 20/80 | 20/80 | — |
|  | Ethylene content in ingredient (b-1) | wt % | — | — | 20.0 | 5.0 | 35.1 | 20.0 | 20.0 | 19.8 | — |
|  | Ethylene content in ingredient (b-2) | wt % | — | — | 44.9 | 44.9 | 44.9 | 35.0 | 60.2 | 45.0 | — |
|  | Mw of ingredient (b-1) ($\times 10^{-5}$) | g/mol | — | — | 3.86 | 3.88 | 3.80 | 3.86 | 3.86 | 2.79 | — |
|  | Mw of ingredient (b-2) ($\times 10^{-5}$) | g/mol | — | — | 3.48 | 3.48 | 3.48 | 3.48 | 3.51 | 1.99 | — |
|  | (b-1):(b-2) weight ratio |  | — | — | 49:51 | 20:80 | 20:80 | 20:80 | 20:80 | 20:80 | — |
| Results of analysis of composition | Mw of PP part ($\times 10^{-5}$) | g/mol | 1.19 | 1.19 | 1.20 | 1.19 | 1.19 | 1.20 | 1.21 | 1.18 | 1.60 |
|  | Melting point, Tm | °C. | 158 | 158 | 158 | 158 | 158 | 158 | 158 | 158 | 161 |
|  | Mw of copolymer ingredient ($\times 10^{-5}$) | g/mol | 3.5 | 3.5 | 3.7 | 3.6 | 3.5 | 3.6 | 3.6 | 2.2 | 2.8 |
|  | Content of copolymer ingredient (according to formula (II)) | wt % | 20.6 | 29.8 | 20.3 | 20.5 | 20.6 | 20.4 | 20.2 | 20.9 | 19.5 |
|  | Ethylene content in copolymer (according to formula (III)) | wt % | 44.9 | 45.1 | 32.6 | 37.1 | 42.9 | 32.1 | 52.3 | 39.9 | 35.5 |
|  | Ethylene content in 100° C.-eluted part | wt % | 0.5 | 0.2 | 0.5 | 0.4 | 0.4 | 0.3 | 0.5 | 0.6 | 11.9 |
| Property | MFR | g/10 /min. | 31 | 21 | 29 | 31 | 31 | 31 | 31 | 60 | 41 |
|  | tanδ peak temperature | °C. | −53 | −53 | −53 | −53 | −53 | −45 | −53 | −53 | −44.5 |
|  | Flexural modulus | MPa | 1150 | 860 | 1150 | 1110 | 1140 | 1170 | 1170 | 1140 | 1210 |
|  | Charpy impact strength, 23° C. | kJ/m² | 4.0 | 5.6 | 9.0 | 4.5 | 4.4 | 7.1 | 4.3 | 3.5 | 9.2 |
|  | Charpy impact strength, 0° C. | kJ/m² | 2.4 | 4.1 | 5.1 | 2.4 | 2.5 | 2.5 | 2.8 | 2.0 | 6.5 |
|  | Charpy impact strength, −30° C. | kJ/m² | 2.3 | 4.0 | 2.5 | 2.3 | 2.3 | 2.2 | 2.4 | 2.0 | 3.8 |
|  | HDT | °C. | 107 | 100 | 107 | 106 | 107 | 107 | 107 | 107 | 105 |

TABLE 6

|  |  | Example A9 | | Example A10 | | Example A11 | |
|---|---|---|---|---|---|---|---|
|  |  | Resin | Parts by weight | Resin | Parts by weight | Resin | Parts by weight |
| Resin composition |  | Production Example 5 | 20 | Production Example 5 | 20 | Production Example 5 | 20 |
|  |  | Production Example 9 | 80 | Production Example 9 | 80 | Production Example 9 | 80 |
|  |  | EOR-1 | 20 | SEBS-1 | 20 | EBM-1 | 20 |
| MFR | g/10 min | 19.1 | | 25.1 | | 19.9 | |
| Flexural modulus | MPa | 650 | | 645 | | 660 | |
| Charpy impact strength, 23° C. | kJ/m$^2$ | 60.1 | | 62.2 | | 53.0 | |
| Charpy impact strength, −30° C. | kJ/m$^2$ | 13.5 | | 14.8 | | 14.2 | |
| HDT | ° C. | 95 | | 94 | | 95 | |

TABLE 7

|  | Example A1 | Example A3 | Comparative Example A1 | Comparative Example A4 |
|---|---|---|---|---|
| Tg attributable to crystalline propylene polymer (tanδ peak temperature in −10 to 10° C.) | 7° C. | 7° C. | 7° C. | 5° C. |

[Discussion based on Comparison between Examples A and Comparative Examples A]

The Examples and Comparative Examples given above are discussed below while comparing these. It is apparent that the novel propylene resin compositions of the Examples, which satisfy each of the essential constituent requirements in the invention comprising the amount and ethylene content of the propylene polymer ingredient (a), amount and ethylene content of the copolymer ingredient (b) determined by TREF, proportion and ethylene contents of the copolymer ingredients (b-1) and (b-2) determined by TREF, and melting point of the composition, have a highly excellent balance between flexural modulus, which is an index to rigidity, and impact resistance at each temperature.

It can be further seen that the composition of each Example has been improved also in low-temperature (−30° C.) impact resistance and has synergistically enhanced impact resistance at each temperature because it contains the low-ethylene-content copolymer ingredient (b-1) as a compatibilizing agent under specific conditions, which is a feature of the invention. With respect to heat resistance also, it is balanced with other properties. Compared to Comparative Example A9, in which a Ziegler catalyst was used, the Examples according to the invention are superior in heat resistance corresponding to rigidity. In particular, Examples A9 to A11 have a satisfactory balance between rigidity and impact resistance because an elastomer ingredient has been additionally incorporated, and have exceedingly satisfactory impact resistance at each temperature.

In Comparative Examples A1 and A2, the compositions are poor in impact resistance at each temperature because they do not contain ingredient (b-1), which has a low ethylene content and serves as a compatibilizing agent ingredient. In particular, the composition of Comparative Example A2 has poor impact resistance although satisfactory in flexural modulus, and has a poor balance between these. In Comparative Example A3, ingredient (b) as a whole has a slightly reduced ethylene content because of the too large amount of ingredient (b-1) serving as a compatibilizing agent ingredient and, as a result, the composition has poor low-temperature impact strength. In Comparative Example A4, compatibility with ingredient (b-2) is poor because of the too low ethylene content of ingredient (b-1) and, as a result, the composition has poor impact resistance at each temperature. Furthermore, the glass transition temperature attributable to the propylene polymer in Comparative Example A4 is slightly lower than in other Examples as shown in Table 7 and it can hence be seen that ingredient (b-1) has dissolved preferentially in ingredient (a). Because of this, this composition has slightly poor rigidity. Conversely in Comparative Example A5, compatibility with ingredient (a) is poor because of the too high ethylene content of ingredient (b-1) and this composition also has poor impact resistance at each temperature. In Comparative Example A6, a sufficiently lowered glass transition temperature (tan δ peak temperature) cannot be attained because of the too low ethylene content of ingredient (b-2) and this composition has poor low-temperature impact resistance. In Comparative Example A7, the ethylene content of ingredient (b-2) and the ethylene content of the copolymer (b) are too high although ingredient (b-1) has an ethylene content in a proper range. Because of this, compatibility impairment is unavoidable and the composition has poor impact resistance at each temperature. In Comparative Example A8, ingredient (b-2) has too low a weight-average molecular weight and, hence, the composition has poor impact resistance at each temperature. Comparative Example A9 is a propylene resin composition produced with a Ziegler catalyst by a related-art technique. Because of this, the composition, when compared to the Examples, has a higher glass transition temperature and a poorer balance between rigidity and low-temperature impact resistance.

The results of the Examples and Comparative Examples and the discussion given above have demonstrated the rationality and significance of the requirements in the constitution of the invention and clearly showed the incomparable superiority of the invention over related-art techniques.

Examples B1 to B14

Each set of ingredients (I) to (III) was mixed together in the proportion shown in Table 8. Under the same conditions as in Example A1, additives were incorporated thereinto and the composition was granulated and molded. The test pieces obtained were evaluated for properties. The granulation conditions and molding conditions are shown below.

The indexes of each resin composition, data of analysis by TREF-GPC-IR, and data on properties are shown in Table 10.

Comparative Examples B1 to B10

Each set of ingredients (I) to (III) was mixed together in the proportion shown in Table 9. The resultant compositions were evaluated in the same manners as in the Examples. The results of the evaluation are shown in Table 11.

TABLE 8

| | Propylene resin composition | | | | | |
|---|---|---|---|---|---|---|
| | Ingredient (I) propylene block copolymer | | | Ingredient (II) elastomer | | Ingredient (III) |
| | Kind | wt % | Parts by weight | Kind | Parts by weight | inorganic filler Parts by weight |
| Example B1 | Production Example 1 | 100 | 100 | EOR-1 | 20 | 25 |
| | | | | | 100 | |
| Example B2 | Production Example 2 | 100 | 100 | EOR-1 | 20 | 25 |
| | | | | | 100 | |
| Example B3 | Production Example 5 | 20 | 100 | EOR-1 | 20 | 25 |
| | Production Example 9 | 80 | | | 100 | |
| Example B4 | Production Example 4 | 20 | 100 | EOR-1 | 20 | 25 |
| | Production Example 9 | 80 | | | 100 | |
| Example B5 | Production Example 5 | 20 | 100 | EOR-1 | 20 | 25 |
| | Production Example 10 | 80 | | | 100 | |
| Example B6 | Production Example 5 | 35 | 100 | EOR-1 | 20 | 25 |
| | Production Example 9 | 65 | | | 100 | |
| Example B7 | Production Example 5 | 5 | 100 | EOR-1 | 20 | 25 |
| | Production Example 9 | 95 | | | 100 | |
| Example B8 | Production Example 7 | 20 | 100 | EOR-1 | 20 | 25 |
| | Production Example 9 | 80 | | | 100 | |
| Example B9 | Production Example 5 | 20 | 100 | SEBS-1 | 20 | 25 |
| | Production Example 9 | 80 | | | 100 | |
| Example B10 | Production Example 5 | 35 | 100 | EBR-1 | 20 | 25 |
| | Production Example 9 | 65 | | | 100 | |
| Example B11 | Production Example 5 | 35 | 100 | EOR-1 | 40 | 21 |
| | Production Example 9 | 65 | | | 100 | |
| Example B12 | Production Example 5 | 35 | 100 | — | — | 30 |
| | Production Example 9 | 65 | | | 100 | |
| Example B13 | Production Example 5 | 35 | 100 | EOR-1 | 20 | 8.3 |
| | Production Example 9 | 65 | | | 100 | |
| Example B14 | Production Example 5 | 35 | 100 | EOR-1 | 20 | 41 |
| | Production Example 9 | 65 | | | 100 | |

TABLE 9

| | Propylene resin composition | | | | | |
|---|---|---|---|---|---|---|
| | Ingredient (I) propylene block copolymer | | Ingredient (II) elastomer | | | Ingredient (III) |
| | Kind | wt % | Parts by weight | Kind | Parts by weight | Parts by weight | inorganic filler Parts by weight |
| Comparative Example B1 | Production Example 9 | 100 | 100 | EOR-1 | 20 | 100 | 25 |
| Comparative Example B2 | Production Example 13 | 100 | 100 | EOR-1 | 20 | 100 | 25 |
| Comparative Example B3 | Production Example 5 Production Example 9 | 50 50 | 100 | EOR-1 | 20 | 100 | 25 |
| Comparative Example B4 | Production Example 3 Production Example 9 | 20 80 | 100 | EOR-1 | 20 | 100 | 25 |
| Comparative Example B5 | Production Example 6 Production Example 9 | 20 80 | 100 | EOR-1 | 20 | 100 | 25 |
| Comparative Example B6 | Production Example 5 Production Example 8 | 20 80 | 100 | EOR-1 | 20 | 100 | 25 |
| Comparative Example B7 | Production Example 5 Production Example 11 | 20 80 | 100 | EOR-1 | 20 | 100 | 25 |
| Comparative Example B8 | Production Example 7 Production Example 12 | 20 80 | 100 | EOR-1 | 20 | 100 | 25 |
| Comparative Example B9 | Production Example 14 | 100 | 100 | EOR-1 | 20 | 100 | 25 |
| Comparative Example B10 | Production Example 5 Production Example 9 | 35 65 | 100 | EOR-1 | 20 | 100 | 25 |

TABLE 10

| | | | | Example B1 | Example B2 | Example B3 | Example B4 | Example B5 | Example B6 | Example B7 |
|---|---|---|---|---|---|---|---|---|---|---|
| Ingredient (b) | Composition index | Ethylene content in ingredient (b-1) | wt % | 20.0 | 20.0 | 20.0 | 15.0 | 20.0 | 20.0 | 20.0 |
| | | Ethylene content in ingredient (b-2) | wt % | 45.0 | 45.0 | 44.9 | 44.9 | 50.0 | 44.9 | 44.9 |
| | | Mw of ingredient (b-1) (×10$^{-5}$) | g/mol | 3.80 | 3.80 | 3.86 | 3.85 | 3.86 | 3.86 | 3.86 |
| | | Mw of ingredient (b-2) (×10$^{-5}$) | g/mol | 3.45 | 3.50 | 3.48 | 3.48 | 3.55 | 3.48 | 3.48 |
| | | (b-1):(b-2) weight ratio | | 19:81 | 21:79 | 20:80 | 20:80 | 20:80 | 34:66 | 5:95 |
| | Results of analysis of composition | Mw of PP part (×10$^{-5}$) | g/mol | 1.19 | 1.19 | 1.19 | 1.19 | 1.19 | 1.20 | 1.19 |
| | | Melting point, Tm | °C. | 158 | 158 | 158 | 158 | 158 | 158 | 158 |
| | | Mw of copolymer ingredient (×10$^{-5}$) | g/mol | 3.6 | 3.6 | 3.6 | 3.6 | 3.6 | 3.6 | 3.5 |

TABLE 10-continued

|  |  |  | |  |  |  |  |  |  |  |
|---|---|---|---|---|---|---|---|---|---|---|
|  |  | Content of copolymer ingredient (according to formula (II)) | wt % | 21.2 | 29.8 | 20.5 | 20.7 | 19.9 | 20.4 | 20.6 |
|  |  | Ethylene content in copolymer (according to formula (III)) | wt % | 40.1 | 40.0 | 40.0 | 38.8 | 44.0 | 36.4 | 43.7 |
|  |  | Ethylene content in 100° C.-eluted part | wt % | 0.4 | 0.5 | 0.4 | 0.5 | 0.3 | 0.5 | 0.3 |
|  |  | tanδ peak temperature | ° C. | −53 | −53 | −53 | −53 | −55 | −50 | −53 |
|  | Property | MFR | g/10 min | 28 | 21 | 20 | 21 | 21 | 20 | 21 |
|  |  | Flexural Modulus | MPa | 1800 | 1450 | 1820 | 1830 | 1810 | 1790 | 1770 |
|  |  | Charpy impact strength, 23° C. | kJ/m² | 55.0 | 66.0 | 61.0 | 58.2 | 57.3 | 58.3 | 57.3 |
|  |  | Charpy impact strength, −30° C. | kJ/m² | 10.0 | 12.0 | 9.2 | 8.8 | 9.0 | 9.2 | 8.8 |
|  |  | HDT | ° C. | 121 | 114 | 120 | 121 | 121 | 121 | 120 |

|  |  |  |  | Example B8 | Example B9 | Example B10 | Example B11 | Example B12 | Example B13 | Example B14 |
|---|---|---|---|---|---|---|---|---|---|---|
| Ingredient (b) | Composition index | Ethylene content in ingredient (b-1) | wt % | 19.8 | 20.0 | 20.0 | 20.0 | 20.0 | 20.0 | 20.0 |
|  |  | Ethylene content in ingredient (b-2) | wt % | 44.9 | 44.9 | 44.9 | 44.9 | 44.9 | 44.9 | 44.9 |
|  |  | Mw of ingredient (b-1) (×10⁻⁵) | g/mol | 2.79 | 3.86 | 3.86 | 3.86 | 3.86 | 3.86 | 3.86 |
|  |  | Mw of ingredient (b-2) (×10⁻⁵) | g/mol | 3.48 | 3.48 | 3.48 | 3.48 | 3.48 | 3.48 | 3.48 |
|  |  | (b-1):(b-2) weight ratio |  | 21:79 | 34:66 | 34:66 | 34:66 | 34:66 | 34:66 | 34:66 |
|  | Results of analysis of composition | Mw of PP part (×10⁻⁵) | g/mol | 1.19 | 1.20 | 1.20 | 1.20 | 1.20 | 1.20 | 1.20 |
|  |  | Melting point, Tm | ° C. | 158 | 158 | 158 | 158 | 158 | 158 | 158 |
|  |  | Mw of copolymer ingredient (×10⁻⁵) | g/mol | 3.3 | 3.6 | 3.6 | 3.6 | 3.6 | 3.6 | 3.6 |
|  |  | Content of copolymer ingredient (according to formula (II)) | wt % | 20.7 | 20.4 | 20.4 | 20.4 | 20.4 | 20.4 | 20.4 |
|  |  | Ethylene content in copolymer (according to formula (III)) | wt % | 39.7 | 36.4 | 36.4 | 36.4 | 36.4 | 36.4 | 36.4 |
|  |  | Ethylene content in 100° C.-eluted part | wt % | 0.3 | 0.5 | 0.5 | 0.5 | 0.5 | 0.5 | 0.5 |
|  |  | tanδ peak temperature | ° C. | −53 | −50 | −50 | −50 | −50 | −50 | −50 |

TABLE 10-continued

| Property | | | | | | | | | |
|---|---|---|---|---|---|---|---|---|---|
| Property | MFR | g/10 min | 22 | 26 | 20 | 13 | 29 | 20 | 17 |
| | Flexural Modulus | MPa | 1840 | 1790 | 1780 | 1250 | 2540 | 1050 | 2350 |
| | Charpy impact strength, 23° C. | kJ/m$^2$ | 56.4 | 64.3 | 61.2 | 65.4 | 35.0 | 65.4 | 38.0 |
| | Charpy impact strength, −30° C. | kJ/m$^2$ | 8.5 | 11.4 | 9.8 | 12.3 | 6.4 | 11.5 | 7.7 |
| | HDT | ° C. | 122 | 121 | 121 | 108 | 135 | 111 | 133 |

TABLE 11

| | | | | Comparative Example B1 | Comparative Example B2 | Comparative Example B3 | Comparative Example B4 | Comparative Example B5 | Comparative Example B6 | Comparative Example B7 | Comparative Example B8 | Comparative Example B9 | Comparative Example B10 |
|---|---|---|---|---|---|---|---|---|---|---|---|---|---|
| Ingredient (b) | Composition index | Ethylene content in ingredient (b-1) | wt % | — | — | 20.0 | 5.0 | 35.1 | 20.0 | 20.0 | 19.8 | — | 20.0 |
| | | Ethylene content in ingredient (b-2) | wt % | — | — | 44.9 | 44.9 | 44.9 | 35.0 | 60.2 | 45.0 | — | 44.9 |
| | | Mw of ingredient (b-1) (×10$^{-5}$) | g/mol | — | — | 3.86 | 3.88 | 3.80 | 3.86 | 3.86 | 2.79 | — | 3.86 |
| | | Mw of ingredient (b-2) (×10$^{-5}$) | g/mol | — | — | 3.48 | 3.48 | 3.48 | 3.48 | 3.51 | 1.99 | — | 3.48 |
| | | (b-1):(b-2) weight ratio | | — | — | 49:51 | 20:80 | 20:80 | 20:80 | 20:80 | 20:80 | — | 34:66 |
| | Results of analysis of composition | Mw of PP part (×10$^{-5}$) | g/mol | 1.19 | 1.19 | 1.20 | 1.19 | 1.19 | 1.20 | 1.21 | 1.18 | 1.60 | 1.20 |
| | | Melting point, Tm | ° C. | 158 | 158 | 158 | 158 | 158 | 158 | 158 | 158 | 161 | 158 |
| | | Mw of copolymer ingredient (×10$^{-5}$) | g/mol | 3.5 | 3.5 | 3.7 | 3.6 | 3.5 | 3.6 | 3.6 | 2.2 | 2.8 | 3.6 |
| | | Content of copolymer ingredient (according to formula (II)) | wt % | 20.6 | 29.8 | 20.3 | 20.5 | 20.6 | 20.4 | 20.2 | 20.9 | 19.5 | 20.4 |
| | | Ethylene content in copolymer (according to formula (III)) | wt % | 44.9 | 45.1 | 32.6 | 37.1 | 42.9 | 32.1 | 52.3 | 39.9 | 35.5 | 36.4 |
| | | Ethylene content in 100° C.-eluted part | wt % | 0.5 | 0.2 | 0.5 | 0.4 | 0.4 | 0.3 | 0.5 | 0.6 | 11.9 | 0.5 |
| | | tanδ peak temperature | ° C. | −53 | −53 | −53 | −53 | −53 | −45 | −53 | −53 | −44.5 | −50 |
| Property | | MFR | g/10 min. | 20 | 15 | 19 | 21 | 21 | 21 | 21 | 35 | 26 | 20 |
| | | Flexural modulus | MPa | 1800 | 1460 | 1780 | 1790 | 1750 | 1820 | 1880 | 1820 | 1890 | 3450 |
| | | Charpy impact strength, 23° C. | kJ/m$^2$ | 34.0 | 38.0 | 33.0 | 32.2 | 33.3 | 31.5 | 34.2 | 30.2 | 29.2 | 10.3 |
| | | Charpy impact strength, −30° C. | kJ/m$^2$ | 4.3 | 5.8 | 4.5 | 4.3 | 4.3 | 4.2 | 4.4 | 4.0 | 5.2 | 4.3 |
| | | HDT | ° C. | 119 | 118 | 119 | 116 | 118 | 119 | 118 | 117 | 115 | 139 |

[Discussion based on Comparison between Examples B and Comparative Examples B]

The Examples and Comparative Examples given above are discussed below while comparing these. It is apparent that the resin compositions of the Examples, which contain the novel propylene block copolymer composition satisfying each of the essential constituent requirements in the invention comprising the amount and ethylene content of the propylene polymer ingredient (a), amount and ethylene content of the copolymer ingredient (b) determined by TREF, proportion and ethylene contents of the copolymer ingredients (b-1) and (b-2) determined by TREF, melting point of the composition, and incorporation of an elastomer and an inorganic filler, have a highly excellent balance between flexural modulus, which is an index to rigidity, and impact resistance at each temperature.

It can be further seen that the composition of each Example has been improved also in low-temperature (−30° C.) impact resistance and has synergistically enhanced impact resistance at each temperature because it contains the low-ethylene-content copolymer ingredient (b-1) as a compatibilizing agent under specific conditions, which is a feature of the invention. With respect to heat resistance also, it is balanced with other properties. Compared to Comparative Example B9, in which a Ziegler catalyst was used, the Examples according to the invention are superior in balance among rigidity, impact resistance, and heat resistance.

In Comparative Examples B1 and B2, the compositions are poor in impact resistance at each temperature because they do not contain ingredient (b-1), which has a low ethylene content and serves as a compatibilizing agent ingredient. In particular, the composition of Comparative Example B1 has poor impact resistance although satisfactory in flexural modulus, and has a poor balance between these. In Comparative Example B3, ingredient (b) as a whole has a slightly reduced ethylene content because of the too large amount of ingredient (b-1) serving as a compatibilizing agent ingredient and, as a result, the composition has poor low-temperature impact strength. In Comparative Example B4, compatibility with ingredient (b-2) is poor because of the too low ethylene content of ingredient (b-1) and, as a result, the composition has poor impact resistance at each temperature. Conversely in Comparative Example B5, compatibility with ingredient (a) is poor because of the too high ethylene content of ingredient (b-1) and this composition also has poor impact resistance at each temperature. In Comparative Example B6, a sufficiently lowered glass transition temperature (tan δ peak temperature) cannot be attained because of the too low ethylene content of ingredient (b-2) and this composition has poor low-temperature impact resistance. In Comparative Example B7, the ethylene content of ingredient (b-2) and the ethylene content of the copolymer (b) are too high although ingredient (b-1) has an ethylene content in a proper range. Because of this, compatibility impairment is unavoidable and the composition has poor impact resistance at each temperature. In Comparative Example B8, ingredient (b-2) has too low a weight-average molecular weight and, hence, the composition has poor impact resistance at each temperature. Comparative Example B9 is a propylene resin composition produced with a Ziegler catalyst by a related-art technique. Because of this, the composition, when compared to the Examples, has a higher glass transition temperature and a poorer balance between rigidity and low-temperature impact resistance. The composition of Comparative Example B10 has considerably reduced impact resistance, even though satisfactory in heat resistance, because of the large amount of the talc incorporated. To sum up, all the Comparative Examples have an exceedingly poor balance among flexural modulus, heat resistance, and impact resistance at each temperature because none of the compositions satisfies the constituent requirements in the invention.

The results of the Examples and Comparative Examples and the discussion given above have demonstrated the rationality and significance of the requirements in the constitution of the invention and clearly showed the incomparable superiority of the invention over related-art techniques.

Examples C1 to C16

Each set of ingredients (I) to (IV) was mixed together in the proportion shown in Table 12 and the composition was granulated and molded under the following conditions. The test pieces obtained were evaluated for properties. The granulation conditions and molding conditions are the same as in Examples B1 to B14.

(Additive Incorporation) Antioxidant: tetrakis{methylene-3-(3',5'-di-t-butyl-4'-hydroxyphenyl)propionate}methane 0.05 wt % and tris(2,4-di-t-butylphenyl) phosphite 0.05 wt %; Neutralizing agent: calcium stearate 0.1 wt %.

The indexes of each resin composition, data of analysis by TREF-GPC-IR, and data on properties are shown in Table 14.

Comparative Examples C1 to C14

Each set of ingredients (I) to (IV) was mixed in the proportion shown in Table 13. The resultant compositions were evaluated in the same manners as in the Examples. The results of the evaluation are shown in Table 15.

TABLE 12

| | Propylene resin composition | | | | | | | |
|---|---|---|---|---|---|---|---|---|
| | Ingredient (I) impact modifier | | | Ingredient (II) propylene block copolymer | | Ingredient (III) elastomer | | Ingredient (IV) inorganic filler |
| | Kind | wt % | Parts by weight | Kind | wt % | Kind | wt % | Parts by weight | Parts by weight |
| Example C1 | Production Example 1 | 100 | 33 | Z-1 | 75 | EOR-1 | 25 | 100 | 33.0 |
| Example C2 | Production Example 2 | 100 | 33 | Z-1 | 75 | EOR-1 | 25 | 100 | 33.0 |
| Example C3 | Production Example 5 | 20 | 33 | Z-1 | 75 | EOR-1 | 25 | 100 | 33.0 |
| | Production Example 9 | 80 | | | | | | | |
| Example C4 | Production Example 4 | 20 | 33 | Z-1 | 75 | EOR-1 | 25 | 100 | 33.0 |
| | Production Example 9 | 80 | | | | | | | |
| Example C5 | Production Example 5 | 20 | 33 | Z-1 | 75 | EOR-1 | 25 | 100 | 33.0 |
| | Production Example 10 | 80 | | | | | | | |
| Example C6 | Production Example 5 | 35 | 33 | Z-1 | 75 | EOR-1 | 25 | 100 | 33.0 |
| | Production Example 9 | 65 | | | | | | | |
| Example C7 | Production Example 5 | 5 | 33 | Z-1 | 75 | EOR-1 | 25 | 100 | 33.0 |
| | Production Example 9 | 95 | | | | | | | |
| Example C8 | Production Example 7 | 20 | 33 | Z-1 | 75 | EOR-1 | 25 | 100 | 33.0 |
| | Production Example 9 | 80 | | | | | | | |

TABLE 12-continued

| | Propylene resin composition | | | | | | | | |
|---|---|---|---|---|---|---|---|---|---|
| | Ingredient (I) impact modifier | | | Ingredient (II) propylene block copolymer | | Ingredient (III) elastomer | | | Ingredient (IV) inorganic filler |
| | Kind | wt % | Parts by weight | Kind | wt % | Kind | wt % | Parts by weight | Parts by weight |
| Example C9 | Production Example 5 | 20 | 33 | Z-1 | 75 | SEBS-1 | 25 | 100 | 33.0 |
| | Production Example 9 | 80 | | | | | | | |
| Example C10 | Production Example 5 | 35 | 33 | Z-1 | 75 | EBR-1 | 25 | 100 | 33.0 |
| | Production Example 9 | 65 | | | | | | | |
| Example C11 | Production Example 5 | 35 | 33 | Z-1 | 50 | EOR-1 | 50 | 100 | 33.0 |
| | Production Example 9 | 65 | | | | | | | |
| Example C12 | Production Example 5 | 35 | 14 | Z-1 | 73 | EOR-1 | 27 | 100 | 28.0 |
| | Production Example 9 | 65 | | | | | | | |
| Example C13 | Production Example 5 | 35 | 33 | Z-1 | 75 | EOR-1 | 25 | 100 | 0 |
| | Production Example 9 | 65 | | | | | | | |
| Example C14 | Production Example 5 | 35 | 33 | Z-1 | 78 | EOR-1 | 22 | 100 | 88.0 |
| | Production Example 9 | 65 | | | | | | | |
| Example C15 | Production Example 5 | 35 | 33 | Z-3 | 75 | EOR-1 | 25 | 100 | 33.0 |
| | Production Example 9 | 65 | | | | | | | |
| Example C16 | Production Example 5 | 35 | 33 | Z-4 | 75 | EOR-1 | 25 | 100 | 33.0 |
| | Production Example 9 | 65 | | | | | | | |

TALE 13

| | Propylene resin composition | | | | | | | | |
|---|---|---|---|---|---|---|---|---|---|
| | Ingredient (I) impact modifier | | | Ingredient (II) propylene block copolymer | | Ingredient (III) elastomer | | | Ingredient (IV) inorganic filler |
| | Kind | wt % | Parts by weight | Kind | wt % | Kind | wt % | Parts by weight | Parts by weight |
| Comparative Example C1 | Production Example 9 | 100 | 33 | Z-1 | 75 | EOR-1 | 25 | 100 | 33 |
| Comparative Example C2 | Production Example 13 | 100 | 33 | Z-1 | 75 | EOR-1 | 25 | 100 | 33 |
| Comparative Example C3 | Production Example 5 | 50 | 33 | Z-1 | 75 | EOR-1 | 25 | 100 | 33 |
| | Production Example 9 | 50 | | | | | | | |
| Comparative Example C4 | Production Example 3 | 20 | 33 | Z-1 | 75 | EOR-1 | 25 | 100 | 33 |
| | Production Example 9 | 80 | | | | | | | |
| Comparative Example C5 | Production Example 6 | 20 | 33 | Z-1 | 75 | EOR-1 | 25 | 100 | 33 |
| | Production Example 9 | 80 | | | | | | | |

TABLE 13-continued

| | Ingredient (I) impact modifier | | | Ingredient (II) propylene block copolymer | | Ingredient (III) elastomer | | | Ingredient (IV) inorganic filler |
|---|---|---|---|---|---|---|---|---|---|
| | Kind | wt % | Parts by weight | Kind | wt % | Kind | wt % | Parts by weight | Parts by weight |
| Comparative Example C6 | Production Example 5 Production Example 8 | 20 80 | 33 | Z-1 | 75 | EOR-1 | 25 | 100 | 33 |
| Comparative Example C7 | Production Example 5 Production Example 11 | 20 80 | 33 | Z-1 | 75 | EOR-1 | 25 | 100 | 33 |
| Comparative Example C8 | Production Example 7 Production Example 12 | 20 80 | 33 | Z-1 | 75 | EOR-1 | 25 | 100 | 33 |
| Comparative Example C9 | Production Example 14 | 100 | 31 | Z-1 | 81 | EOR-1 | 19 | 100 | 25 |
| Comparative Example C10 | Production Example 5 Production Example 9 | 35 65 | 7 | Z-1 | 80 | EOR-1 | 20 | 100 | 27 |
| Comparative Example C11 | Production Example 5 Production Example 9 | 35 65 | 166 | Z-1 | 50 | EOR-1 | 50 | 100 | 66 |
| Comparative Example C12 | Production Example 5 Production Example 9 | 35 65 | 33 | Z-1 | 100 | EOR-1 | — | 100 | 33 |
| Comparative Example C13 | Production Example 5 Production Example 9 | 35 65 | 33 | Z-1 | 83 | EOR-1 | 17 | 100 | 200 |
| Comparative Example C14 | Production Example 5 Production Example 9 | 35 65 | 16 | Z-2 | 75 | EOR-1 | 25 | 100 | 33 |

TABLE 14

| | | | | Example C1 | Example C2 | Example C3 | Example C4 | Example C5 | Example C6 | Example C7 | Example C8 |
|---|---|---|---|---|---|---|---|---|---|---|---|
| Ingredient (b) | Composition index | Ethylene content in ingredient (b-1) | wt % | 20.0 | 20.0 | 20.0 | 15.0 | 20.0 | 20.0 | 20.0 | 19.8 |
| | | Ethylene content in ingredient (b-2) | wt % | 45.0 | 45.0 | 44.9 | 44.9 | 50.0 | 44.9 | 44.9 | 44.9 |
| | | Mw of ingredient (b-1) ($\times 10^{-5}$) | g/mol | 3.80 | 3.80 | 3.86 | 3.85 | 3.86 | 3.86 | 3.86 | 2.79 |
| | | Mw of ingredient (b-2) ($\times 10^{-5}$) | g/mol | 3.45 | 3.50 | 3.48 | 3.48 | 3.55 | 3.46 | 3.46 | 3.48 |
| | | (b-1):(b-2) weight ratio | | 19:81 | 21:79 | 20:80: | 20:80 | 20:80 | 34:66 | 5:95 | 21:79 |
| | Results of analysis of composition | Mw of PP part ($\times 10^{-5}$) | g/mol | 1.19 | 1.19 | 1.19 | 1.19 | 1.19 | 1.20 | 1.19 | 1.19 |
| | | Melting point, Tm | °C. | 158 | 158 | 158 | 158 | 158 | 158 | 158 | 158 |
| | | Mw of copolymer ingredient ($\times 10^{-5}$) | g/mol | 3.6 | 3.6 | 3.6 | 3.6 | 3.6 | 3.6 | 3.5 | 3.3 |

TABLE 14-continued

| | | | | | | | | | | | |
|---|---|---|---|---|---|---|---|---|---|---|---|
| | | Content of copolymer ingredient (according to formula (II)) | wt % | 21.2 | 29.8 | 20.5 | 20.7 | 19.9 | 20.4 | 20.6 | 20.7 |
| | | Ethylene content in copolymer (according to formula (III)) | wt % | 40.1 | 40.0 | 40.0 | 38.8 | 44.0 | 36.4 | 43.7 | 39.7 |
| | | Ethylene content in 100° C.-eluted part | wt % | 0.4 | 0.5 | 0.4 | 0.5 | 0.3 | 0.5 | 0.3 | 0.3 |
| | | tanδ peak temperature | ° C. | −53 | −53 | −53 | −53 | −55 | −50 | −53 | −53 |
| | Property | MFR | g/10 min. | 23.1 | 18.6 | 18.3 | 18.5 | 18.4 | 18.6 | 18.4 | 19.0 |
| | | Flexural modulus | MPa | 1750 | 1700 | 1760 | 1752 | 1762 | 1741 | 1755 | 1770 |
| | | Charpy impact strength, 23° C. | kJ/m² | 45.0 | 50.3 | 45.3 | 43.2 | 41.3 | 40.6 | 45.3 | 48.0 |
| | | Charpy impact strength, −30° C. | kJ/m² | 8.9 | 9.5 | 9.1 | 8.7 | 8.5 | 8.9 | 8.5 | 8.9 |
| | | HDT | ° C. | 119 | 116 | 119 | 118 | 117 | 117 | 117 | 116 |
| | | Flow mark | | A | A | A | A | A | A | A | A |

| | | | | Example C9 | Example C10 | Example C11 | Example C12 | Example C13 | Example C14 | Example C15 | Example C16 |
|---|---|---|---|---|---|---|---|---|---|---|---|
| Ingredient (b) | Composition index | Ethylene content in ingredient (b-1) | wt % | 20.0 | 20.0 | 20.0 | 20.0 | 20.0 | 20.0 | 20.0 | 20.0 |
| | | Ethylene content in ingredient (b-2) | wt % | 44.9 | 44.9 | 44.9 | 44.9 | 44.9 | 44.9 | 44.9 | 44.9 |
| | | Mw of ingredient (b-1) (×10⁻⁵) | g/mol | 3.86 | 3.86 | 3.86 | 3.86 | 3.86 | 3.86 | 3.86 | 3.86 |
| | | Mw of ingredient (b-2) (×10⁻⁵) | g/mol | 3.48 | 3.48 | 3.48 | 3.48 | 3.48 | 3.48 | 3.48 | 3.48 |
| | | (b-1):(b-2) weight ratio | | 34:66 | 34:66 | 34:66 | 34:66 | 34:66 | 34:66 | 34:66 | 34:66 |
| | Results of analysis of composition | Mw of PP part (×10⁻⁵) | g/mol | 1.20 | 1.20 | 1.20 | 1.20 | 1.20 | 1.20 | 1.20 | 1.20 |
| | | Melting point, Tm | ° C. | 158 | 158 | 158 | 158 | 158 | 158 | 158 | 158 |
| | | Mw of copolymer ingredient (×10⁻⁵) | g/mol | 3.6 | 3.6 | 3.6 | 3.6 | 3.6 | 3.6 | 3.6 | 3.6 |
| | | Content of copolymer ingredient (according to formula (II)) | wt % | 20.4 | 20.4 | 20.4 | 20.4 | 20.4 | 20.4 | 20.4 | 20.4 |
| | | Ethylene content in copolymer (according to formula (III)) | wt % | 36.4 | 36.4 | 36.4 | 36.4 | 36.4 | 36.4 | 36.4 | 36.4 |
| | | Ethylene content in 100° C.-eluted part | wt % | 0.5 | 0.5 | 0.5 | 0.5 | 0.5 | 0.5 | 0.5 | 0.5 |
| | | tanδ peak temperature | ° C. | −50 | −50 | −50 | −50 | −50 | −50 | −50 | −50 |

TABLE 14-continued

| Property | | | | | | | | | |
|---|---|---|---|---|---|---|---|---|---|
| | MFR | g/10 min. | 23.2 | 18.6 | 10.5 | 18.3 | 19.4 | 18.3 | 27.0 | 36.2 |
| | Flexural modulus | MPa | 1779 | 1765 | 1050 | 1760 | 850 | 3500 | 1855 | 1912 |
| | Charpy impact strength, 23° C. | kJ/m$^2$ | 49.3 | 45.3 | 70.3 | 40.1 | 32.4 | 25.0 | 38.0 | 36.0 |
| | Charpy impact strength, −30° C. | kJ/m$^2$ | 10.1 | 9.5 | 12.1 | 8.1 | 9.5 | 6.1 | 7.8 | 7.6 |
| | HDT | ° C. | 115 | 117 | 103 | 115 | 100 | 133 | 122 | 123 |
| | Flow mark | | A | A | B | A | A | A | A | A |

TABLE 15

| | | | | Comparative Example C1 | Comparative Example C2 | Comparative Example C3 | Comparative Example C4 | Comparative Example C5 | Comparative Example C6 | Comparative Example C7 |
|---|---|---|---|---|---|---|---|---|---|---|
| Ingredient (b) | Composition index | Ethylene content in ingredient (b-1) | wt % | — | — | 20.0 | 5.0 | 35.1 | 20.0 | 20.0 |
| | | Ethylene content in ingredient (b-2) | wt % | — | — | 44.9 | 44.9 | 44.9 | 35.0 | 60.2 |
| | | Mw of ingredient (b-1) (×10$^{-5}$) | g/mol | — | — | 3.86 | 3.88 | 3.80 | 3.86 | 3.86 |
| | | Mw of ingredient (b-2) (×10$^{-5}$) | g/mol | — | — | 3.48 | 3.48 | 3.48 | 3.48 | 3.51 |
| | | (b-1):(b-2) weight ratio | | — | — | 49:51 | 20:80 | 20:80 | 20:80 | 20:80 |
| | Results of analysis of composition | Mw of PP part (×10$^{-5}$) | g/mol | 1.19 | 1.19 | 1.20 | 1.19 | 1.19 | 1.20 | 1.21 |
| | | Melting point, Tm | ° C. | 158 | 158 | 158 | 158 | 158 | 158 | 158 |
| | | Mw of copolymer ingredient (×10$^{-5}$) | g/mol | 3.5 | 3.5 | 3.7 | 3.6 | 3.5 | 3.6 | 3.6 |
| | | Content of copolymer ingredient (according to formula (II)) | wt % | 20.6 | 29.8 | 20.3 | 20.5 | 20.6 | 20.4 | 20.2 |
| | | Ethylene content in copolymer (according to formula (III)) | wt % | 44.9 | 45.1 | 32.6 | 37.1 | 42.9 | 32.1 | 52.3 |
| | | Ethylene content in 100° C.-eluted part | wt % | 0.5 | 0.2 | 0.5 | 0.4 | 0.4 | 0.3 | 0.5 |
| | tanδ peak temperature | | ° C. | −53 | −53 | −53 | −53 | −53 | −45 | −53 |
| | Property | MFR | g/10 min. | 18.3 | 16.2 | 18.4 | 18.2 | 18.5 | 18.4 | 18.6 |
| | | Flexural Modulus | MPa | 1740 | 1730 | 1750 | 1720 | 1750 | 1770 | 1770 |
| | | Charpy impact strength, 23° C. | kJ/m$^2$ | 36.0 | 38.0 | 36.0 | 33.0 | 33.0 | 31.0 | 32.0 |

TABLE 15-continued

|  |  |  | | | | | | | | |
|---|---|---|---|---|---|---|---|---|---|---|
| | | Charpy impact strength, −30° C. | kJ/m² | 5.2 | 5.5 | 5.7 | 5.1 | 5.3 | 5.2 | 5.0 |
| | | HDT | ° C. | 118 | 115 | 116 | 116 | 115 | 117 | 116 |
| | | Flow mark | | A | A | A | A | A | A | A |

|  |  |  | | Comparative Example C8 | Comparative Example C9 | Comparative Example C10 | Comparative Example C11 | Comparative Example C12 | Comparative Example C13 | Comparative Example C14 |
|---|---|---|---|---|---|---|---|---|---|---|
| Ingredient (b) | Composition index | Ethylene content in ingredient (b-1) | wt % | 19.8 | — | 20.0 | 20.0 | 20.0 | 20.0 | 20.0 |
| | | Ethylene content in ingredient (b-2) | wt % | 45.0 | — | 44.9 | 44.9 | 44.9 | 44.9 | 44.9 |
| | | Mw of ingredient (b-1) (×10⁻⁵) | g/mol | 2.79 | — | 3.86 | 3.86 | 3.86 | 3.86 | 3.86 |
| | | Mw of ingredient (b-2) (×10⁻⁵) | g/mol | 1.99 | — | 3.48 | 3.48 | 3.48 | 3.48 | 3.48 |
| | | (b-1):(b-2) weight ratio | | 20:80 | — | 34:66 | 34:66 | 34:66 | 34:66 | 34:66 |
| | Results of analysis of composition | Mw of PP part (×10⁻⁵) | g/mol | 1.18 | 1.60 | 1.20 | 1.20 | 1.20 | 1.20 | 1.20 |
| | | Melting point, Tm | ° C. | 158 | 161 | 158 | 158 | 158 | 158 | 158 |
| | | Mw of copolymer ingredient (×10⁻⁵) | g/mol | 2.2 | 2.8 | 3.6 | 3.6 | 3.6 | 3.6 | 3.6 |
| | | Content of copolymer ingredient (according to formula (II)) | wt % | 20.9 | 19.5 | 20.4 | 20.4 | 20.4 | 20.4 | 20.4 |
| | | Ethylene content in copolymer (according to formula (III)) | wt % | 39.9 | 35.5 | 36.4 | 36.4 | 36.4 | 36.4 | 36.4 |
| | | Ethylene content in 100° C.-eluted part | wt % | 0.6 | 11.9 | 0.5 | 0.5 | 0.5 | 0.5 | 0.5 |
| | | tanδ peak temperature | ° C. | −53 | −44.5 | −50 | −50 | −50 | −50 | −50 |
| | Property | MFR | g/10 min. | 21.3 | 30.2 | 19.2 | 19.6 | 21.3 | 19.1 | 4.3 |
| | | Flexural Modulus | MPa | 1779 | 1810 | 1680 | 1740 | 2300 | 5210 | 1700 |
| | | Charpy impact strength, 23° C. | kJ/m² | 32.0 | 34.0 | 38.0 | 41.0 | 25.0 | 10.2 | 41.3 |
| | | Charpy impact strength, −30° C. | kJ/m² | 5.2 | 5.7 | 6.0 | 8.3 | 3.1 | 2.5 | 6.5 |
| | | HDT | ° C. | 113 | 110 | 109 | 119 | 127 | 138 | 118 |
| | | Flow mark | | A | A | A | C | A | C | C |

[Discussion based on Comparison between Examples C and Comparative Examples C]

The Examples and Comparative Examples given above are discussed below while comparing these. It is apparent that the resin compositions of the Examples, which comprise as an impact modifier the novel propylene block copolymer composition ingredient (I) satisfying each of the essential constituent requirements in the invention comprising the amount and ethylene content of the propylene polymer ingredient (a), amount and ethylene content of the copolymer ingredient (b) determined by TREF, proportion and ethylene contents of the copolymer ingredients (b-1) and (b-2) determined by TREF, and melting point of the composition and which further contain ingredients (II) to (IV) compounded with the ingredient (I), have a highly excellent balance between flexural modulus, which is an index to rigidity, and impact resistance at each temperature.

It can be further seen that the composition of each Example has been improved also in low-temperature (−30° C.) impact resistance and is satisfactory in molded-article appearance concerning flow marks. It can also be seen that the composition has synergistically enhanced impact resistance at each temperature because it contains the low-ethylene-content copolymer ingredient (b-1) as a compatibilizing agent under specific conditions, which is a feature of the invention. With respect to heat resistance also, it is balanced with other properties. Compared to Comparative Example C9, in which a Ziegler catalyst was used, the Examples according to the invention are superior in balance among rigidity, impact resistance, and heat resistance.

In Comparative Examples C1 and C2, the compositions are poor in impact resistance at each temperature because they do not contain ingredient (b-1), which has a low ethylene content and serves as a compatibilizing agent ingredient. These compositions have poor impact resistance although satisfactory in flexural modulus, and have a poor balance between these. In Comparative Example C3, ingredient (b) as a whole has a slightly reduced ethylene content because of the too large amount of ingredient (b-1) serving as a compatibilizing agent ingredient and, as a result, the composition has poor low-temperature impact strength. In Comparative Example C4, compatibility with ingredient (b-2) is poor because of the too low ethylene content of ingredient (b-1) and, as a result, the composition has poor impact resistance at each temperature. Conversely in Comparative Example C5, compatibility with ingredient (a) is poor because of the too high ethylene content of ingredient (b-1) and this composition also has poor impact resistance at each temperature. In Comparative Example C6, a sufficiently lowered glass transition temperature (tan δ peak temperature) cannot be attained because of the too low ethylene content of ingredient (b-2) and this composition has poor low-temperature impact resistance. In Comparative Example C7, the ethylene content of ingredient (b-2) and the ethylene content of the copolymer (b) are too high although ingredient (b-1) has an ethylene content in a proper range. Because of this, compatibility impairment is unavoidable and the composition has poor impact resistance at each temperature. In Comparative Example C8, ingredient (b-2) has too low a weight-average molecular weight and, hence, the composition has poor impact resistance at each temperature. Comparative Example C9 is a propylene resin composition produced with a Ziegler catalyst by a related-art technique. Because of this, the composition, when compared to the Examples, has a higher glass transition temperature and a poorer balance between rigidity and low-temperature impact resistance. Comparative Example C10 is poor in impact resistance because of the too small amount of ingredient (I) as an impact modifier. Comparative Example 11 is poor in appearance performance because of the too small amount of ingredient (IV), which is a propylene block copolymer produced with a Ziegler type catalyst. In Comparative Example C12, the composition has exceedingly poor impact resistance because it contains no elastomer. In Comparative Example C13, the composition has considerably reduced impact resistance and poor appearance performance because the amount of ingredient (IV), which is a propylene block copolymer produced with a Ziegler catalyst, is too small and the talc amount is too large. In Comparative Example C14, the propylene resin composition has a lowered MFR and hence reduced appearance performance because the ingredient (IV), which is a propylene block copolymer produced with a Ziegler catalyst, has a low MFR.

The results of the Examples and Comparative Examples and the discussion given above have demonstrated the rationality and significance of the requirements in the constitution of the invention. In particular, the usefulness of ingredient (I) according to the invention as an impact modifier has been clearly demonstrated. Furthermore, the incomparable superiority of the invention over related-art techniques has also been shown.

While the invention has been described in detail and with reference to specific embodiments thereof, it will be apparent to one skilled in the art that various changes and modifications can be made therein without departing from the spirit and scope thereof.

This application is based on a Japanese patent application filed on Sep. 22, 2005 (Application No. 2005-275623) and a Japanese patent application filed on Jan. 27, 2006 (Application No. 2006-019890), the contents thereof being herein incorporated by reference.

INDUSTRIAL APPLICABILITY

The invention relates to a three-component resin composition comprising a specific crystalline propylene polymer ingredient and two specific propylene/ethylene copolymer ingredients. Specifically, the invention relates to a composition which comprises a crystalline propylene polymer ingredient and two propylene/ethylene copolymers, has been obtained by conducting multistage successive polymerization using a metallocene catalyst, with which highly homogeneous copolymerization is possible, or by blending the ingredients, and is characterized by being excellent in rigidity, heat resistance, and impact resistance while attaining a satisfactory balance among these and by being improved also in low-temperature impact resistance.

The invention claimed is:
1. A propylene resin composition comprising:
60-95 wt % of a crystalline propylene polymer ingredient (a) comprising a propylene homopolymer ingredient or a copolymer of propylene and up to 3 wt % ethylene or an α-olefin having 4-20 carbon atoms; and
40-5 wt % of a propylene/ethylene copolymer ingredient (b),
wherein the ingredients are polymerized using a metallocene catalyst, and the composition satisfies the following properties i) to iv):
i) A melting point obtained by differential scanning calorimetry (DSC) is 156° C. or higher,
ii) A proportion of the copolymer ingredient (b) determined by a temperature rising elution fractionation (TREF) fractionating at three levels of temperature of 40° C., 100° C., and 140° C., is 5-40 wt %,
iii) An ethylene content of the copolymer ingredient (b) determined by a temperature rising elution fractionation (TREF) fractionating at three levels of temperature of 40° C., 100° C., and 140° C., is 30-50 wt %, and an average ethylene content in components eluting at 40-100° C. is 10 wt % or lower, and
iv) The propylene/ethylene copolymer ingredient (b) comprises at least two kinds of propylene/ethylene copolymer ingredients (b-1) and (b-2), each of which differs in ethylene content, wherein an ethylene content of the ingredient (b-1) and an ethylene content of the ingredient (b-2) are 15-30 wt % and 40-55 wt %, respectively, and the ratio of the amount of ingredient (b-1) to that of ingredient (b-2), (b-1):(b-2), is in the range of from 10:90 to 30:70.

2. The propylene resin composition as claimed in claim 1, which satisfies the following property v):
   v) A tan δ peak temperature attributable to the propylene/ethylene copolymer ingredient (b) obtained by a solid viscoelasticity measurement in the range of −80 to 150° C. under the condition of a frequency of 1 Hz, is present at −47° C. or lower.

3. The propylene resin composition as claimed in claim 1, wherein the ingredient (b-1) and ingredient (b-2) in the propylene/ethylene copolymer each has a weight-average molecular weight of 250,000-1,000,000, and the ingredient (a) has a weight-average molecular weight of 60,000-250,000.

4. The propylene resin composition as claimed in claim 1, wherein a weight-average molecular weight of the ingredient (b-1) in the propylene/ethylene copolymer is not lower than a weight-average molecular weight of the ingredient (b-2) in the propylene/ethylene copolymer.

5. The propylene resin composition as claimed in claim 1, which shows a synergistically enhanced impact resistance depending on the proportion of the propylene/ethylene copolymer ingredient (b-1) to ingredient (b-2).

6. A resin composition comprising: (I) 100 parts by weight of the propylene resin composition as claimed in claim 1 and (II) 1-70 parts by weight of an ethylene/α-olefin elastomer or styrene elastomer.

7. The resin composition as claimed in claim 6, which comprises (III) 1-500 parts by weight of an inorganic filler per 100 parts by weight of the ingredient (I).

8. The resin composition as claimed in claim 7, wherein the inorganic filler is talc.

9. The resin composition as claimed in claim 6, which has a flexural modulus of 800 MPa or higher and a Charpy impact value at −30° C. of 6.1 kJ/m² or higher.

10. A molded article obtained by injection-molding the resin composition as claimed in claim 9.

11. A polyolefin resin composition comprising:
    100 parts by weight of a resin composition comprising:
    (IV) 45-85 wt % of propylene block copolymer which has an MFR (230° C., 21.18-N load) of 15-200 g/10 min and is polymerized using a Ziegler catalyst; and (II) 55-15 wt % of ethylene/α-olefin elastomer or styrene elastomer as ingredient (II); and
    (I) 12-75 parts by weight of the propylene resin composition as claimed in claim 1.

12. The polyolefin resin composition as claimed in claim 11, which comprises (III) 1-125 parts by weight of an inorganic filler per 100 parts by weight of the sum of the ingredient (IV) and ingredient (II).

13. The propylene resin composition as claimed in claim 1, wherein the average ethylene content in components eluting at 40-100° C. is 5 wt % or lower.

14. The propylene resin composition as claimed in claim 1, wherein the average ethylene content in components eluting at 40-100° C. is 1 wt % or lower.

15. A process for production of the propylene resin composition as claimed in any of claims 1 to 4, comprising producing each of the ingredients by sequential multistage polymerization, or separately obtaining the ingredients by polymerization and mixing the ingredients together, or producing the ingredients by a combination of these processes.

16. A process for production of the propylene resin composition as claimed in any of claims 1 to 4, comprising producing the ingredients (a) and (b) in the presence of a metallocene catalyst comprising: (A) a transition metal compound represented by the following general formula [I]; and (B) at least one kind of activators selected from the group consisting of (B-1) an organic aluminumoxy compound, (B-2) a compound capable of reacting with a transition metal compound to form a cation, and (B-3) an ion-exchangeable layered compound:

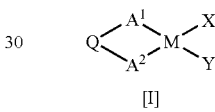

[Ka-1]

wherein $A^1$ and $A^2$ represent a conjugated five-membered ring ligand [$A^1$ and $A^2$ in the same compound may be the same or different] and the carbon atoms in each conjugated five-membered ring which are not bonded to the bonding group Q may have a substituent; Q represents a bonding group which bridges the two conjugated five-membered ring ligands in any position; M represents an atom of a metal selected from Groups 4 to 6 of the periodic table; and X and Y each independently represents a hydrogen atom, halogen atom, hydrocarbon group, amino group, halogenated hydrocarbon group, oxygen-containing hydrocarbon group, nitrogen-containing hydrocarbon group, phosphorus-containing hydrocarbon group, or silicon-containing hydrocarbon group, which are bonded to the M.

* * * * *